US007258612B2

(12) United States Patent
Fujimoto

(10) Patent No.: US 7,258,612 B2
(45) Date of Patent: Aug. 21, 2007

(54) GAME FACILITY MONITORING SYSTEM AND GAME FACILITY

(75) Inventor: Jun Fujimoto, Tokyo (JP)

(73) Assignees: Seta Corporation, Tokyo (JP); Aruze Corporation, Tokyo (JP)

( * ) Notice: Subject to any disclaimer, the term of this patent is extended or adjusted under 35 U.S.C. 154(b) by 785 days.

(21) Appl. No.: 10/139,636

(22) Filed: May 7, 2002

(65) Prior Publication Data

US 2003/0211885 A1 Nov. 13, 2003

(51) Int. Cl.
*A63F 9/24* (2006.01)
*G06F 17/00* (2006.01)

(52) U.S. Cl. .......................................... 463/29; 463/25

(58) Field of Classification Search .................... 463/1, 463/24, 25, 29, 43

See application file for complete search history.

(56) References Cited

U.S. PATENT DOCUMENTS 5,496,032 A * 3/1996 Okada ......................... 463/25
5,683,081 A * 11/1997 Takatoshi et al. ....... 273/121 B
5,850,076 A * 12/1998 Morioka et al. ............ 235/379
6,641,484 B2 * 11/2003 Oles et al. ..................... 463/47
6,804,763 B1 * 10/2004 Stockdale et al. ............ 463/24

FOREIGN PATENT DOCUMENTS

| | | |
|---|---|---|
| JP | 6-7529 | 1/1994 |
| JP | 6-39127 | 2/1994 |
| JP | 8-110992 | 4/1996 |
| JP | 10-179895 | 7/1998 |
| JP | 11-57186 | 3/1999 |
| JP | 2000-61117 | 11/1999 |
| JP | 2001-224818 | 8/2001 |
| JP | 2001-300105 | 10/2001 |

OTHER PUBLICATIONS

Email From Morohashi, Chisato Regarding the translation of Fujimoto Atsushi/Jun and JP2000-124224, May 16, 2006.*

* cited by examiner

*Primary Examiner*—Mark Sager
*Assistant Examiner*—Robert Mosser
(74) *Attorney, Agent, or Firm*—Leydig, Voit & Mayer, Ltd.

(57) ABSTRACT

A system providing greatly improved monitoring against wrong or fraudulent acts. A game facility monitoring system includes game machines or game-related devices provided with detectors that detect the state of a device and the operation of the device resulting from wrong or fraudulent acts, detects the state of the device and the operation of the device possibly resulting from wrong or fraudulent acts, and gives out a notification. The system may also include an anomaly warning unit that operates, when any of the detectors is triggered, a warning operation determined by an anomaly level corresponding to the detected contents of multiple anomaly levels.

10 Claims, 26 Drawing Sheets

FIG. 26B

| | SYSTEM SIDE | STAFF |
|---|---|---|
| F | ·WARNING<br>·WIRELESS NOTICE TO SECURITY COMPANY<br>·RECORD DATA OF DATE AND TIME AND CONTENTS<br>·INTERLOCKING WITH VIDEO TAKING SWITCH | [WARNING LEVEL 3]<br>STAFF CHECK MACHINES FIRST THING IN THE MORNING. |
| E | PREPARE DATA OF OPERATOR'S ID, DATE AND TIME, CONTENTS, CERTIFICATE PICTURE, INTERNAL VIDEO. | [WARNING LEVEL 1]<br>BEFORE OPENING THE SHOP, THE SHOP MANAGER CHECKS DATA. IF SUSPICIOUS, CHECK MACHINES. |
| D | WARNING SOUND, WARNING SOUND OF CONTROL COMPUTER, INTERNAL VIDEO ON, CERTIFICATE PICTURE ON (SWITCHOVER VIDEO), REGISTERING PLAYER'S CARD ID AND OTHER DATA. | [WARNING LEVEL 3]<br>STAFF TAKE IMMEDIATE ACTION. |
| C | OPERATOR'S ID, DATE AND TIME, CONTENTS, CERTIFICATE PICTURE, INTERNAL VIDEO. | [WARNING LEVEL 0] |
| B | CAUTION SOUND,<br>WARNING WITH CONTROL COMPUTER, CERTIFICATE PICTURE ON AND VIDEO MONITOR START, REGISTERING PLAYER'S CARD ID AND OTHER DATA. | [WARNING LEVEL 2]<br>VIDEO MONITORING WITH CONTROL COMPUTER AND DIRECT WATCH BY STAFF. |
| A | CAUTION SOUND,<br>WARNING WITH CONTROL COMPUTER, CERTIFICATE PICTURE ON AND VIDEO MONITOR START, REGISTERING PLAYER'S CARD ID AND OTHER DATA. | [WARNING LEVEL 2]<br>VIDEO MONITORING WITH CONTROL COMPUTER AND DIRECT WATCH AND MACHINE CHECK AFTER CLOSING SHOP BY STAFF. |

GAME FACILITY MONITORING SYSTEM AND GAME FACILITY

BACKGROUND OF THE INVENTION

1. Field of the Invention

This invention relates to a system for monitoring game facilities and a game facility. In particular, this invention is suitable for application to a system adapted to monitor abnormal, wrong, or illegal acts by employees, players, or wrongdoers in game facilities for example furnished with pachinko game machines and slot machines.

2. Description of the Related Art

The game balls (pachinko balls) remaining when a play is over with a pachinko game machine for example, have in a sense monetary values because they are exchanged with prize commodities. Therefore, it is possible that skilled wrongdoers attempt to swindle pachinko balls through illegal tricks.

In recent years, pachinko balls are also rented out in various ways. In a way, game balls are rented out by inserting cash into the so-called sandwiched device placed between pachinko game machines. In another way, a player first buys with cash a prepaid card or a like card having the same function as the prepaid card, and inserts the card into the sandwiched device to receive pachinko balls. As described above, in game facilities there are many devices to handle money such as bills or coins, or quasi money having the same values as money.

In such a situation, there are many devices and machines furnished in game facilities to monitor wrongdoings. For example, the pachinko game machines are furnished with a cheat sensor for detecting electromagnetic waves, magnetic forces, or vibration used by a cheater in an attempt to swindle game balls. When such a sensor is actuated, warning is issued or notification is given to a higher rank computer. Devices for handling quasi money for example are also furnished with a theft sensor to perform similar monitoring and warning functions, or arranged that internal operation of the device is permitted to limited employees on condition that an employee inserts an employee's card the employee carries, so that a warning is issued or notification is given to a higher rank computer when the operation is wrong.

In still another arrangement, for example, the entire hall of a game facility is watched with a single or plural monitoring video cameras.

In still another arrangement, history of employee's operation of the devices for handling quasi money is successively recorded to discourage employees from wrongdoing.

Now, there are many types of wrong acts that are thought to be perpetrated in game facilities. Conventionally, those acts are handled as a whole with a limited number of personnel who are also busy doing other ordinary jobs. So the wrong acts are not necessarily immediately coped with.

Even if the employees' history record is taken to find wrong acts of employees, the types of wrong acts are numerous and wrong acts are not easy to find.

Furthermore, wrong acts may be perpetrated not only during the business hours but also outside the business hours, and since power supply to various devices is turned off outside the business hours, there is the possibility that anomaly sensors do not work, or detection and measures are delayed.

Still another problem is that employees versed in the monitor functions may replace a memory (such as a RAM) that has recorded the history of wrong operations, or erase such wrongdoing history without using a regular monitoring computer. Conventionally, such a problem is not sufficiently taken into consideration.

Therefore, a game facility monitoring system with improved wrongdoing monitoring functions is in demand.

SUMMARY OF THE INVENTION

The present invention provides a game facility monitoring system comprising: a plurality of game machines or game-related devices, at least one of the game machines or game-related devices having a detector for detecting a state of the game machine or game-related device or an action of the game machine or game-related device, the state or the action being possibly related to an abnormal act; and anomaly notifying means for performing, when the detector performs a detecting action, a notifying action determined with an anomaly level corresponding to a content detected with the detector out of plural anomaly levels.

Here, an abnormal act is typically a wrong or illegal act. The state or action of a device possibly related to an abnormal act may be such a state or action caused by or possibly caused by an abnormal act. The detector typically gives out notification of the state or action of the game machine or game-related device, besides detecting the state or action. Typically, each of the game machines or game-related devices has the detector, and when any of the detectors performs a detecting action the anomaly notifying means performs the notifying action.

Preferably, the above game facility monitoring system further comprises anomaly data recording means for recording anomaly data that includes information on the anomaly level corresponding to the content detected with the detector.

Here, typically, the anomaly data recording means records the anomaly data when the detector performs the detecting action.

Preferably, in the above game facility monitoring system, the anomaly data recording means records the anomaly data mixed with data having nothing to do directly with a function of the monitoring.

Here, the data having nothing to do directly with the monitoring function typically include the anomaly data of the past that have already been read or dummy data.

Preferably, the above game facility monitoring system further comprises an anomaly data searching means capable of taking out anomaly data of a specified anomaly level out of plural anomaly data recorded in the anomaly data recording means.

Preferably, the above game facility monitoring system further comprises operator limiting means for permitting only a specified person or specified persons to gain access to the anomaly data recording means.

Preferably, in the above game facility monitoring system the game machine or game-related device having the detector has an auxiliary power supply that compensates for the action of the detector when a main power supply is off.

The present invention provides a game facility comprising: a game facility monitoring system as described above; a main power supply for supplying power to the game facility monitoring system; and a game facility hall for placing the game machines or game-related devices.

The present invention provides a game facility monitoring system comprising: a plurality of game machines or game-related devices, at least one of the game machines or game-related devices having a detector for detecting a state of the game machine or game-related device or an action of the game machine or game-related device, the state or the action being possibly related to an abnormal act; and a computer for performing, when the detector performs a detecting action, a notifying action determined with an anomaly level corresponding to a content detected with the detector out of plural anomaly levels.

Preferably, the above game facility monitoring system further comprises anomaly data file for recording anomaly data that includes information on the anomaly level corresponding to the content detected with the detector.

Preferably, in the above game facility monitoring system, the anomaly data file records the anomaly data mixed with data having nothing to do directly with a function of the monitoring.

BRIEF DESCRIPTION OF THE DRAWINGS

The invention will now be described, by way of example, with reference to the accompanying drawings, in which.

The basic Japanese Patent Application No. 2000-124224 filed on Apr. 25, 2000 is hereby incorporated in its entirety by reference into the present application.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS

(A) Embodiment

A game facility monitoring system as an embodiment of the invention will be hereinafter described in detail in reference to appended drawings.

While the game machines in the game facility monitoring system of this embodiment may be of any type as far as they use game balls (balls, tokens, etc.), for the simplicity of explanation, in the following explanation the game machines placed in a game facility are assumed to be pachinko game machines.

(A-1) Constitution and Various Functions of the Embodiment.

Figure 1:
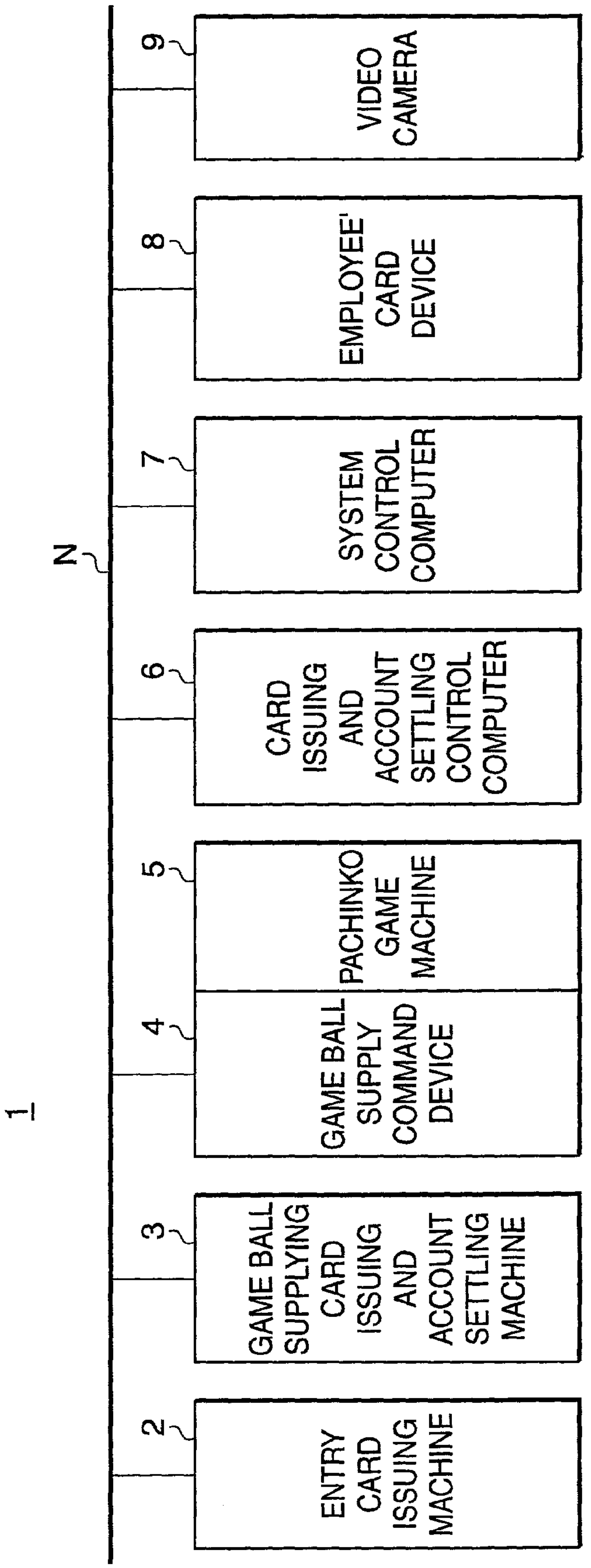
FIG. 1 is a block diagram showing the entire constitution of the game facility card system in an embodiment of the invention.

FIG. 1 is a block diagram showing the constitution of the game facility monitoring system of this embodiment. The system for various cards used in the game facility to which the game facility monitoring system of this embodiment is applied has also special features. The components of the game facility monitoring system described below are also the components of the game facility card system. Therefore, the following explanation is made in terms of not only monitoring but also card processing.

FIG. 1 shows a game facility monitoring system 1 of this embodiment constituted with, an entry card issuing machine 2, a machine 3 for issuing card for dispensing game balls and settling account, a game ball supply command device 4, a pachinko game machine 5, a card issuing and account settling control computer 6, a system control computer 7, an employee's card device 8, and a video camera 9, all connected each other with a network (such as a LAN)N.

(A-1-1) Entry Card Issuing Machine 2.

The entry card issuing machine 2 is to issue an entry card 10 which becomes a condition of issuing a game ball supplying card 35 which will be described later, and is placed for example near the game facility entrance. The entry card issuing machine 2 has an appearance for example as shown in the perspective view of FIG. 2 and its functions are as shown in the block diagram of FIG. 3.

Figure 2:
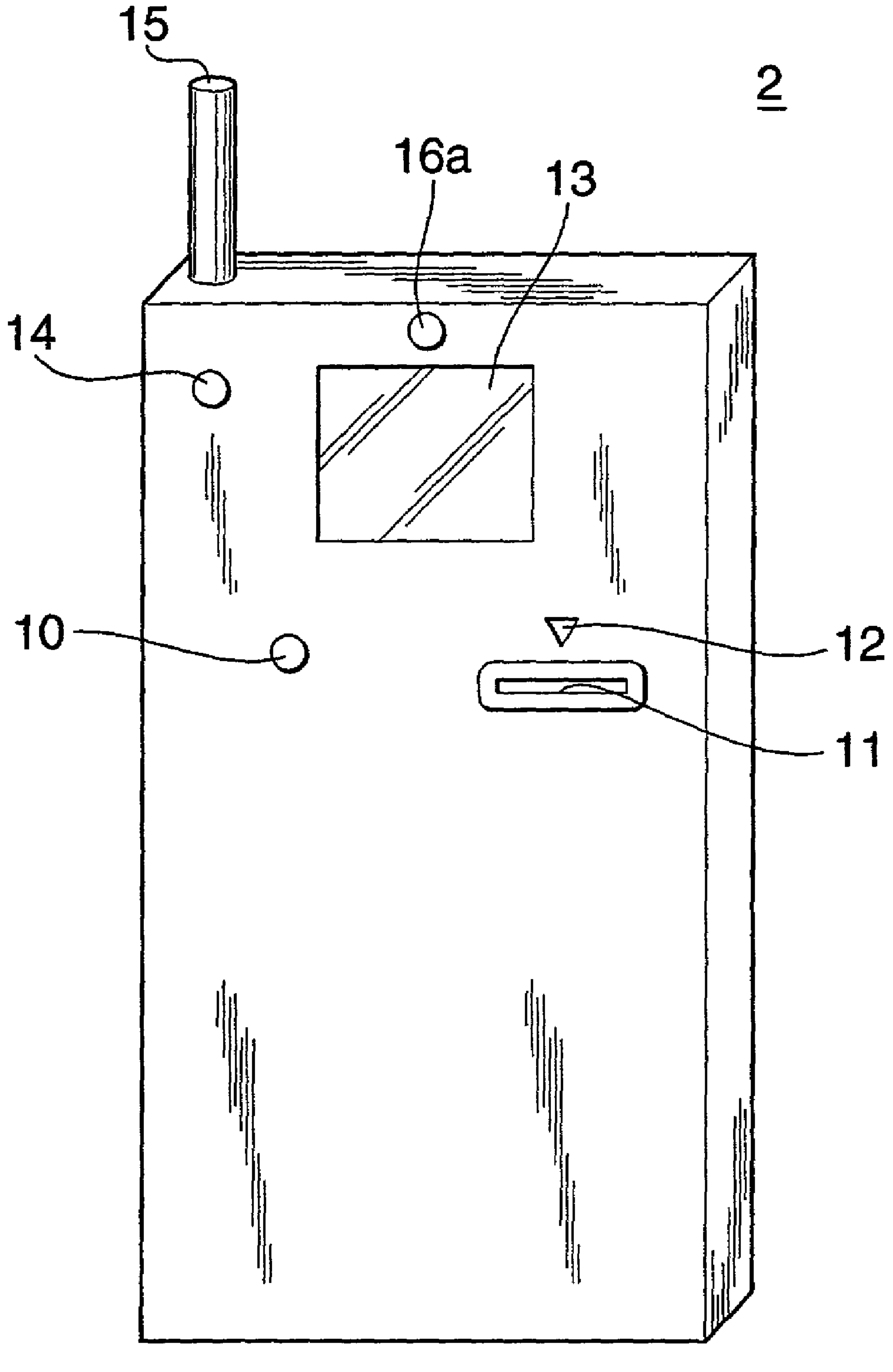
FIG. 2 is an perspective view showing an external image of the entry card issuing machine 2 in an embodiment of the invention.

As shown in FIG. 2, the following components are visible on the outside of the entry card issuing machine 2: a card issuing button 10, a card outlet 11, a card discharge lamp 12, a liquid crystal display (LCD) device 13, an attendant calling button 14, a signal tower lamp (hereinafter called 'signal tower') 15, and an optical window portion 16*a* facing a digital camera 16 (See FIG. 3).

Figure 3:
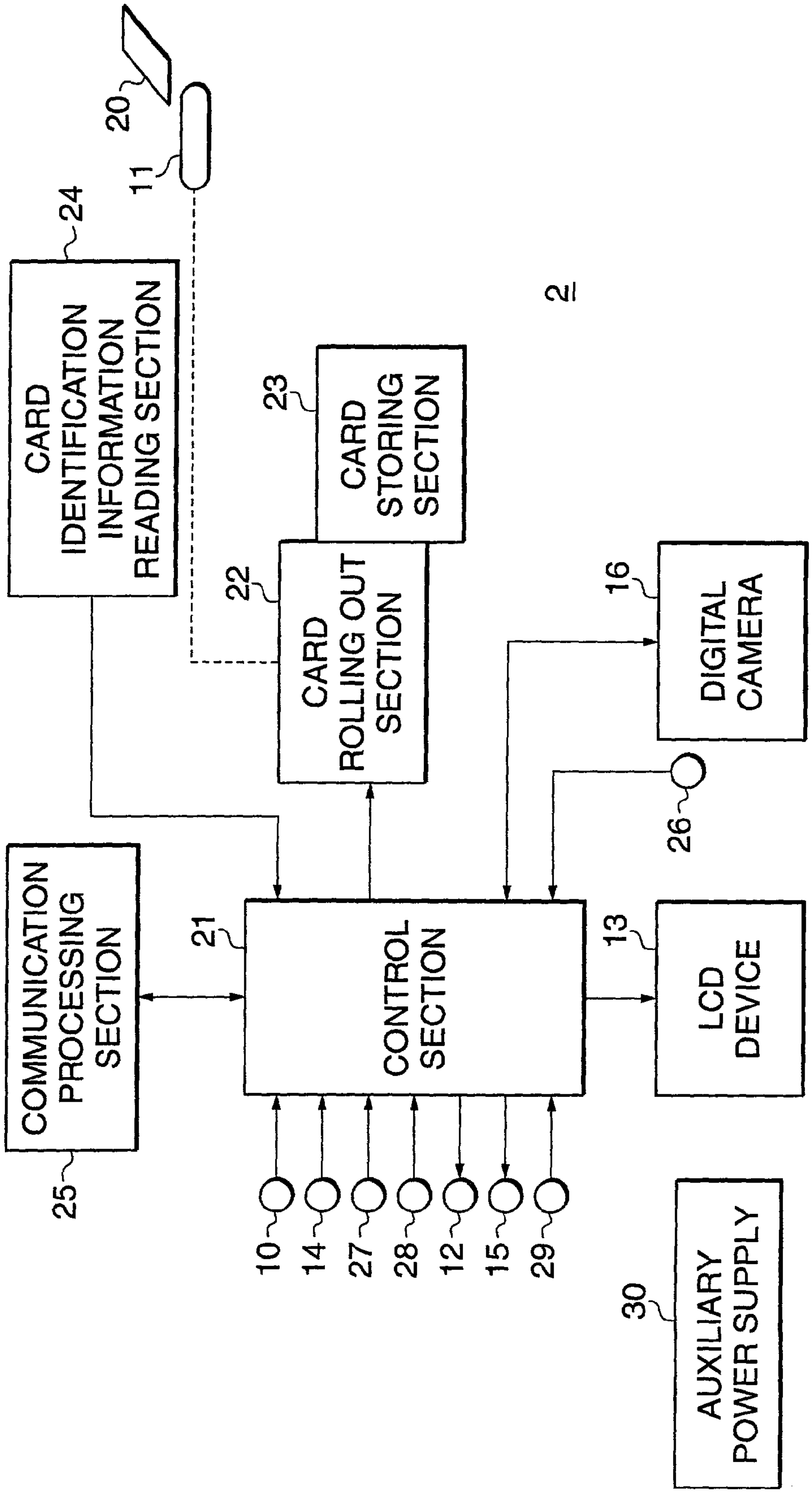
FIG. 3 is a detailed block diagram showing the constitution of the entry card issuing machine 2 in an embodiment of the invention.

In addition to the above components, the entry card issuing machine 2 comprises also the components as shown in the functional block diagram of FIG. 3. They are a digital camera 16, a control section 21, a card rolling out section 22, a card storing section 23, a card identifying information reading section 24, a communication processing section 25, a light amount sensor 26, a door sensor 27, a destruction sensor 28, and a lamp off button 29.

The LCD device 13 under the control of the control section 21 (made of for example a microcomputer) displays a guidance message that prompts a player to operate, and information on the state (such as abnormal state) of the entry card issuing machine 2.

The card issuing button 10 is pressed by a player when the player wants to have an entry card 20 issued. The information on pressing the button is given to the control section 21. The card storing section 23 stores a large number of entry cards 20. The card rolling out section 22 under the control of the control section 21 rolls out an entry card 20 from the card storing section 23, so that the entry card 20 passes through the card identifying information reading section 24 and is discharged out of the card outlet 11. The card identifying information reading section 24 reads information recorded on the entry card 20 that is about to be discharged, and gives the information to the control section 21. The card discharge lamp 12 lights up or blinks when the entry card 20 is discharged under the control of the control section 21.

The attendant calling button 14 is operated by a player to call an attendant (employee) when the player who wants the entry card issued encounters a trouble or the like of the entry card issuing machine 2, and the operation information is given to the control section 21. The signal tower 15 is lit up under the control of the control section 21 to notify the employees of a trouble or anomaly in the entry card issuing machine 2. (Incidentally as a matter of course, a buzzer or the like may be provided as a means for the notification.) The signal tower 15 is lit up for example when the attendant calling button 14 is pressed or when a delivery monitoring sensor (not shown) for the entry card 20 detects an anomaly in the transfer of the entry card 20. The lamp off button 29 is provided in the housing of the entry card issuing machine 2 to turn off the signal tower 15.

The door sensor 27 detects the open/closed state of the door (not shown) of the entry card issuing machine 2 or the locked/unlocked state of the door, and gives signals to the control section 21. The destruction sensor 28 detects destructive anomaly of the entry card issuing machine 2, and gives signals to the control section 21. The sensor is, for example, a vibration sensor or a tilt sensor.

The digital camera 16 is for example a still camera such as a CCD camera or the like (it may also be one that takes images successively for a period of about five seconds) to take an image (or images for a certain duration) under the control of the control section 21 (in other words in response to an image-taking trigger signal given from the control section 21) and to give image signals to the control section 21. The direction of taking images with a digital camera 16 is such that the image of a person (player or employee) who operates the entry card issuing machine 2 can be taken under the condition of the door of the entry card issuing machine 2 closed (including an unlocked state). Incidentally, the digital camera 16 may be provided with a flash lamp to light up under the control of the control section 21.

The optical window portion 16*a* shown in FIG. 2 is an optical aperture (either a simple aperture or an aperture with a glass plate). The main part of the digital camera 16 is placed in the housing. The window portion 16*a* is made larger than the aperture of the object lens of the digital camera 16. Alight amount sensor 26 is placed inside the housing and in the immediate vicinity of the window portion 16*a*.

The light amount sensor 26 monitors and detects an anomaly that the window portion 16*a* is obstructed, namely detects by monitoring the light amount a situation anomaly in which the digital camera 16 cannot take images, and sends an anomaly signal to the control section 21.

The communication processing section 25 under the control of the control section 21 exchanges information with other devices such as the card issuing and account settling computer 6, the system control computer 7, etc. connected to the network N.

The control section 21 controls the entire entry card issuing machine 2. The control function of the control section 21 is roughly divided into the two types, the function of controlling the issue of the entry card 20 and the function of monitoring anomalies. These control functions will be further described later in relation to operations.

Next will be described the entry card 20 issued from the entry card issuing machine 2. On the entry card 20 is fixedly recorded identification information (ID for discriminating from a game ball supplying card 35 or from a membership card 70, to be described later) peculiar to the entry card. While the entry card 20 itself has no value like money, it has the function of making it more prudent to issue the game ball supplying card 35 having monetary values, to be described later. The peculiar ID of the entry card 20 is preferably such that it can discriminate not only the entry card 20 but also the game facility itself The fixedly recording method is for example bar code marking or embossing (forming dent information). Any method suffices for the purpose as long as the record cannot be rewritten.

Though not shown in FIG. 3, it is arranged that power is automatically supplied to the entry card issuing machine 2 when the main power supply of the game facility is turned on. Or, it is arranged that the entry card issuing machine 2 is provided with a power switch, so that power is supplied from outside through a power supply line when the power switch is turned on.

In this embodiment, the entry card issuing machine 2 has a built-in auxiliary power supply 30 to supply power at least to the digital camera 16, the control section 21, the communication processing section 25, the door sensor 27, and the destruction sensor 28 under the condition of power not being supplied from the mains (for example at night). In other words, it is arranged to ensure a minimum of anomaly monitoring function using the auxiliary power supply 30 even if power is not supplied from the mains.

(A-1-2) Game Ball Supplying Card Issuing and Account Settling Machine 3.

One of the functions of the game ball supplying card issuing and account settling machine 3 is to issue game ball supplying cards 35 required when renting pachinko balls (game balls) for playing pachinko games. The game ball supplying card issuing and account settling machine 3 may be placed in any place in the game facility, for example in every group of pachinko game machines.

Figure 4:
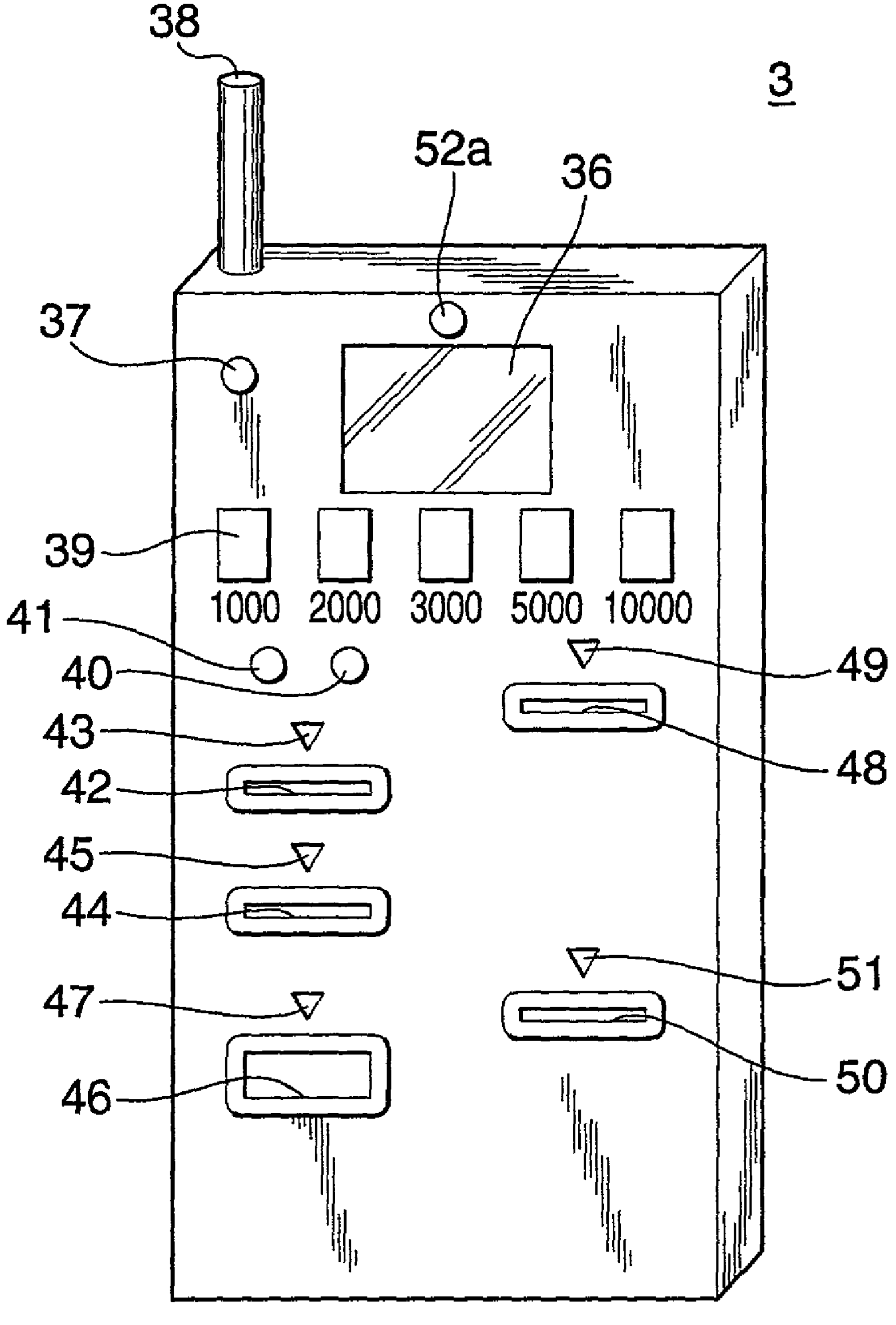
FIG. 4 is an perspective view showing an external image of the game ball supplying card issuing and account settling machine 3 in an embodiment of the invention.
Figure 5:
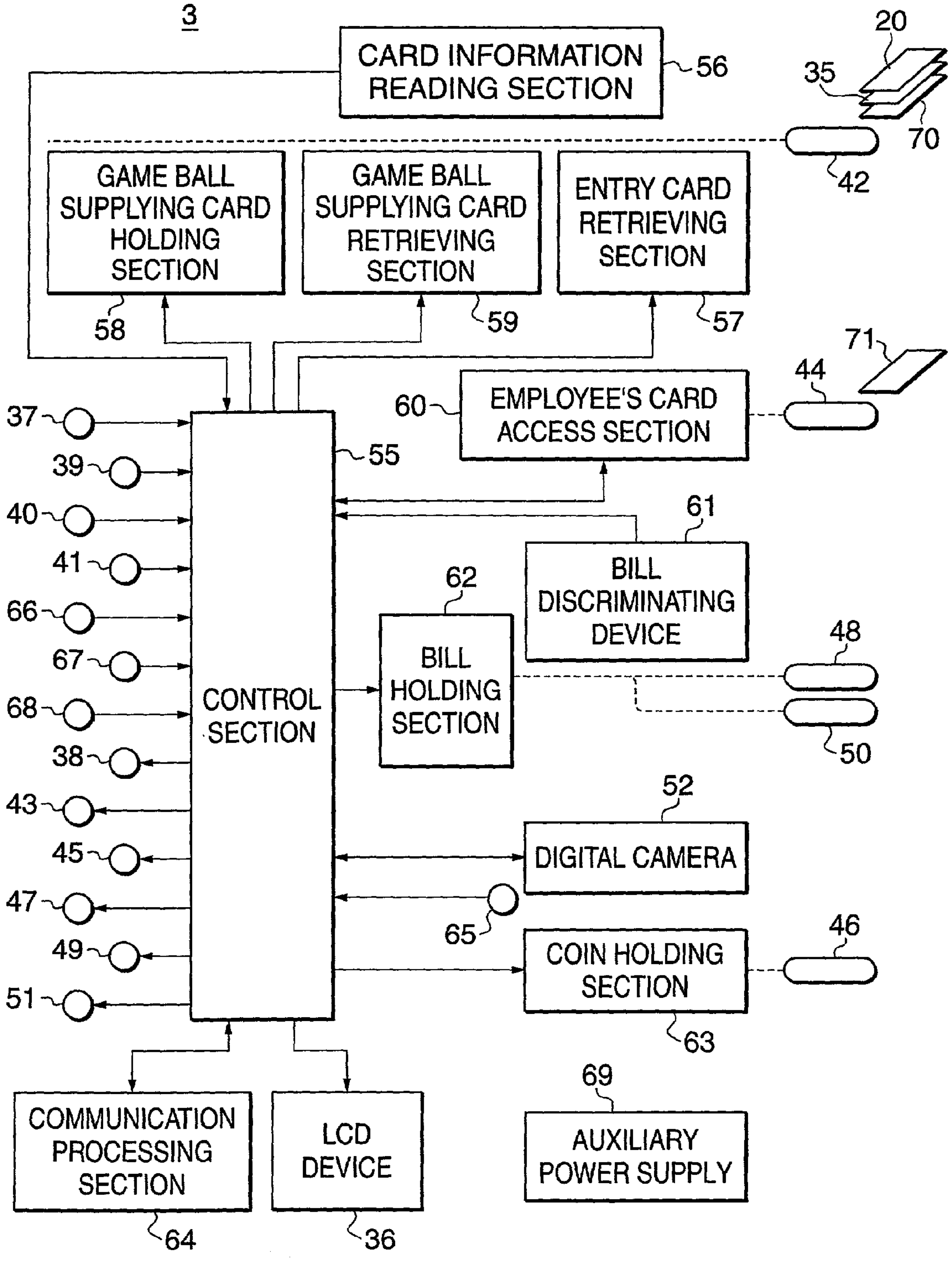
FIG. 5 is a detailed block diagram showing the constitution of the game ball supplying card issuing and account settling machine 3 in an embodiment of the invention.

The game ball supplying card issuing and account settling machine 3 has for example the appearance as shown in the perspective view of FIG. 4 and the function shown in the block diagram of FIG. 5.

Components visible on the outside of the game ball supplying card issuing and account settling machine 3 shown in FIG. 4 are, an LCD device 36, an attendant calling button 37, a signal tower 38, a selection button 39, a settlement button 40, a cancel button 41, a card slot 42, a card passage lamp 43, an employee's card slot 44, an employee's card passage lamp 45, a coin outlet 46, a coin discharge lamp 47, a bill inlet 48, a bill inlet lamp 49, a bill outlet 50, a bill discharge lamp 51, and an optical window portion 52*a* facing a digital camera 52 (See FIG. 5).

The game ball supplying card issuing and account settling machine 3 has further the following components as shown in a functional block diagram of FIG. 5 in addition to those enumerated above. Namely, a digital camera 52, a control section 55, a card information reading section 56, an entry card retrieving section 57, a game ball supplying card holding section 58, a game ball supplying card retrieving section 59, an employee's card access section 60, a bill discriminating device 61, a bill holding section 62, a coin holding section 63, a communication processing section 64, a light amount sensor 65, a door sensor 66, a destruction sensor 67, and a light off button 68.

The LCD device 36, the attendant calling button 37, and the signal tower 38 in the game ball supplying card issuing and account settling machine 3 have also the same functions as the counterparts in the entry card issuing machine 2.

The settlement button 40 is operated by a player when a balance for supplying game balls is present in relation to the inserted game ball supplying card 35 to request settlement of the possible ball supply balance. Information on operating the button is sent to a control section (for example a microcomputer) 55.

The cancel button 41 is operated by a player or the like person to cancel an operation mode or the like of the game ball supplying card issuing and account settling machine 3. The information on operating the button is sent to the control section 55.

The card slot 42 serves as the inlet and outlet for the entry card 20, the game ball supplying card 35, and the membership card 70 as described below. The card passage lamp 43 is controlled with the control section 55 to light up or blink when various types of cards are inserted or discharged through the card slot 42.

The entry card retrieving section 57 is to retrieve and store the entry cards 20 inserted through the card slot 42 under the control of the control section 55.

The game ball supplying card storing section 58 is to store the game ball supplying card 35 to be discharged through the card slot 42, and is provided with a card rolling out mechanism. The stored game ball supplying cards 35 are discharged under the control of the control section 55.

The game ball supplying card retrieving section 59 is to retrieve and store the game ball supplying card 35 inserted through the card slot 42 under the control of the control section 55.

The card information reading section 56 is to read information from the entry card 20, the game ball supplying card 35, and the membership card 70, inserted through the card slot 42, or from the game ball supplying card 35 which is about to be discharged through the card slot 42, and to give the read information to the control section 55.

In this embodiment, the game ball supplying card 35 is necessary to rent out pachinko balls (game balls) for playing pachinko games as described above. On the game ball supplying card 35 is fixedly recorded identification information only (ID for discriminating from the entry card 20 and the membership card 70) peculiar to the game ball supplying card. The peculiar ID of the game ball supplying card 35 is also preferably such that it can discriminate not only the difference in the game ball supplying cards 35 but also the difference in the game facilities. The method of fixedly recording is for example marking bar codes or embossing. Any method suffices for the purpose as long as the record cannot be rewritten.

Although the game ball supplying card 35 has no balance information recorded on itself for supplying game balls, its card ID enables access to the card issuing control computer 6, so that information on the balance for possible game ball supply may be acquired. Therefore, it has similar nature to that of the prepaid card.

For any player who has contracted the game facility for a membership agreement, the membership card 70 has the same function as that of the entry card 20. That is to say, the game ball supplying card 35 is issued to the member player on condition that an authentic membership card 70 is inserted into the game ball supplying card issuing and account settling machine 3.

On the membership card 70 is fixedly recorded only peculiar identification information (ID to discriminate from the entry card 20 and the game ball supplying card 35). The peculiar ID of the membership card 70 can also preferably discriminate not only the difference in the membership card 70 but also the difference in the game facilities themselves.

The employee's card slot 44 is to serve as insertion inlet and discharge outlet for the employee's card 71. The employee's card passage lamp 45 is controlled with the control section 55 to light up or blink when the employee's card 71 is inserted or discharged through the employee's card slot 44.

The employee's card access section 60 reads information from the employee's card 71 inserted through the employee's card slot 44 to give the read information to the control section 55 and writes information given from the control section 55 onto the employee's card 71.

The employee's card 71 is for example an IC card which it is possible to write on and to read from, and to be issued and retrieved with the employee's card device 8. An employee must insert the employee's card 71 into the employee's card slot 44 to operate the game ball supplying card issuing and account settling machine 3.

This embodiment is described on the assumption that the device to be operated on condition of inserting the employee's card 71 is only the game ball supplying card issuing and account settling machine 3. However, also the other devices such as the entry card issuing machine 2 and the game ball supply command device 4 may be adapted to be operable on condition of inserting the employee's card 71. It may also be arranged that an employee permitted to operate a device varies from one device to another, or that the types of operation of a device permitted to be operated by plural employees vary from one employee to another. Information on such difference is recorded as described later in relation to the employee's card 71.

The bill inlet 48 is an opening for the player to insert bills. The coin outlet 46 is an opening for dispensing coins to the player. The bill outlet 50 is an opening to dispense bills to the player. In relation to the above components, bill inlet lamp 49, the coin discharge lamp 47, and the bill discharge lamp 51 are provided to appropriately light up or blink under the control of the control section 55.

Under the control of the control section 55, the bill storing section 62 retrieves bills put in through the bill inlet 48 and rolls out bills through the bill outlet 50. Under the control of the control section 55, the coin storing section 63 rolls out coins to be dispensed through the coin outlet 46.

The bill discriminating device 61 is to discriminate the denominations and authenticity of bills inserted through the bill inlet 48 and dispensed out through the bill outlet 50. Information on the discrimination is given to the control section 55.

There are two cases of inserting bills into the game ball supplying card issuing and account settling machine 3. One is putting in an amount of money as a condition on setting a balance for possible ball supply (the amount of money for which game balls may be supplied) in relation to the game ball supplying card 35 to be issued. The other is putting in an amount of money as a condition on increasing the balance for possible ball supply related to the game ball supplying card 35 already issued.

On the other hand, there are two cases of dispensing bills and coins from the game ball supplying card issuing and account settling machine 3. One is dispensing change when there is a difference between the amount put in and the specified initial setting amount or the increased amount when setting an initial balance for possible ball supply (when issuing a game ball supplying card 35) related to the card 35 or when increasing the ball supply balance. The other is dispensing change according to the balance for possible ball supply in relation to the game ball supplying card 35 when settlement is instructed as the settlement button 40 is pressed.

The selection button 39 is for setting initial balance amount for possible ball supply or for setting an increase in the amount of balance for possible ball supply in relation to the game ball supplying card 35 (at the time of issuing a card 35). A plurality of selection buttons 39 are provided for different values to be specified (for example yen 1000, yen 2000, yen 3000, yen 5000, and yen 10000).

Also the digital camera 52 of the game ball supplying card issuing and account settling machine 3 is for example a still camera such as a CCD camera or the like (it may also be one that takes images successively for a period of about five seconds) to take an image (or images for a certain duration) under the control of the control section 55 (in other words in response to an image-taking trigger signal given from the control section 55) and to give image signals to the control section 55. The direction of taking images with the digital camera 52 is such that the image of a person (player or employee) who operates the game ball supplying card issuing and account settling machine 3 can be taken under the condition of the door of the game ball supplying card issuing and account settling machine 3 closed (including an unlocked state). Incidentally, the digital camera 52 may be provided with a flash lamp to light up under the control of the control section 55.

A light amount sensor 65 of similar function to that of the light amount sensor of the entry card issuing machine 2 is provided near the optical window portion 52*a* in the housing shown in FIG. 4 of the digital camera 52.

The communication processing section 64, the door sensor 66, the destruction sensor 67, and the lamp off button 68 of the game ball supplying card issuing and account settling machine 3 have similar functions to that of the counterparts of the entry card issuing machine 2. Therefore, explanation of the functions is omitted.

The control section 55 controls the entire game ball supplying card issuing and account settling machine 3. The control function with the control section 55 is roughly divided into four: controlling the issue of the game ball supplying card 35, controlling information on the increase in the balance related to the game ball supplying card 35, controlling information on the settlement of the balance related to the game ball supplying card 35, and anomaly monitoring. The control function of the control section 55 will be clarified later with the explanation of operation.

Though not shown in FIG. 5, it is arranged that power is automatically supplied to the game ball supplying card issuing and account settling machine 3 when the main power supply of the game facility is turned on. Or, it is arranged that the game ball supplying card issuing and account settling machine 3 is provided with a power switch, so that power is supplied from outside through a power supply line when the power switch is turned on.

In this embodiment, the game ball supplying card issuing and account settling machine 3 has a built-in auxiliary power supply 69 to supply power at least to the digital camera 52, the control section 55, the communication processing section 64, the door sensor 66, and the destruction sensor 67 under the condition of power not supplied from the mains (for example at night). In other words, it is arranged to provide a minimum of anomaly monitoring function using the auxiliary power supply 69 even if power is not supplied from the mains.

While the system constitution shown in FIG. 1 is assumed to have only the game ball supplying card issuing and account settling machine 3, other system components may also be provided as a matter of course, such as a game ball supplying card issuing machine with the function of only increasing the balance for possible supply and issuing the game ball supplying card 35 and a game ball supplying card settling machine with the function of only settling the balance for possible supply related to the game ball supplying card 35. Also there may be a device for only issuing the game ball supplying card 35 and a device for only increasing the balance for possible supply.

(A-1-3) Game Ball Supply Command Device 4 and Pachinko Game Machine 5.

The above-described game ball supplying card 35 is effectively used to supply game balls with sets of game ball supply command devices (so-called 'card sand') and pachinko game machines. Components and functions of an example set of a game ball supply command device 4 and a pachinko game machine 5 will be described below.

The explanation below assumes that a game ball supply command device that supplies game balls as coins and bills are put in, which is different from the game ball supply command device 4 of this embodiment, is not provided. That is to say, the explanation assumes that the pachinko game machine 5 itself is a so-called CR machine having game ball supplying (ball renting) function. As a matter of course, a game ball supply command device that supplies game balls as coins and bills are put in may be provided in addition to the game ball supply command device 4 of this embodiment.

Figure 6:
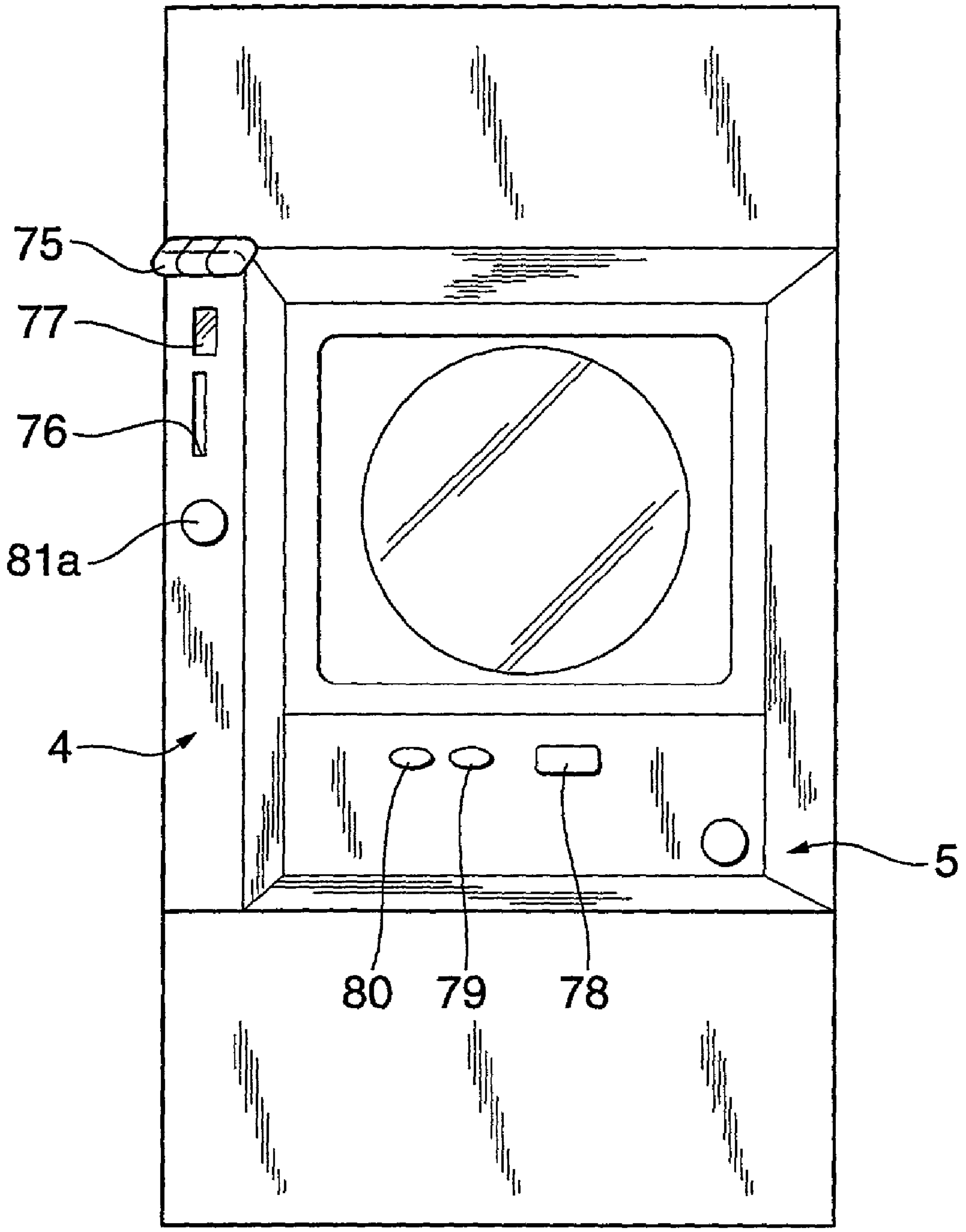
FIG. 6 is an perspective view showing an external image of the game ball supply command device 4 and the pachinko game machine 5 in an embodiment of the invention.

A set of a game ball supply command device 4 and a pachinko game machine 5 looks in external appearance as shown in the perspective view of FIG. 6. The game ball supply command device 4 has functions shown in the block diagram of FIG. 7. Since the pachinko game machine 5 may be a conventional so-called CR machine as it is, its internal details are not shown. Therefore the block diagram shows only the components of the game ball supply command device 4.

In FIG. 6, various components are visible on the outside of the set of the game ball supply command device 4 and the pachinko game machine 5. On the outside of the game ball supply command device 4 are visible: a status lamp 75, a card slot 76, a remote control signal receiving section 77, and an optical window portion (image taking window portion) 81*a* for a digital camera 81(See FIG. 7). On the outside of the pachinko game machine 5 are visible: a balance display section 78, a ball renting button 79, and a return button 80. While many other components are visible on the pachinko game machine 5, their explanation is omitted here.

Figure 7:
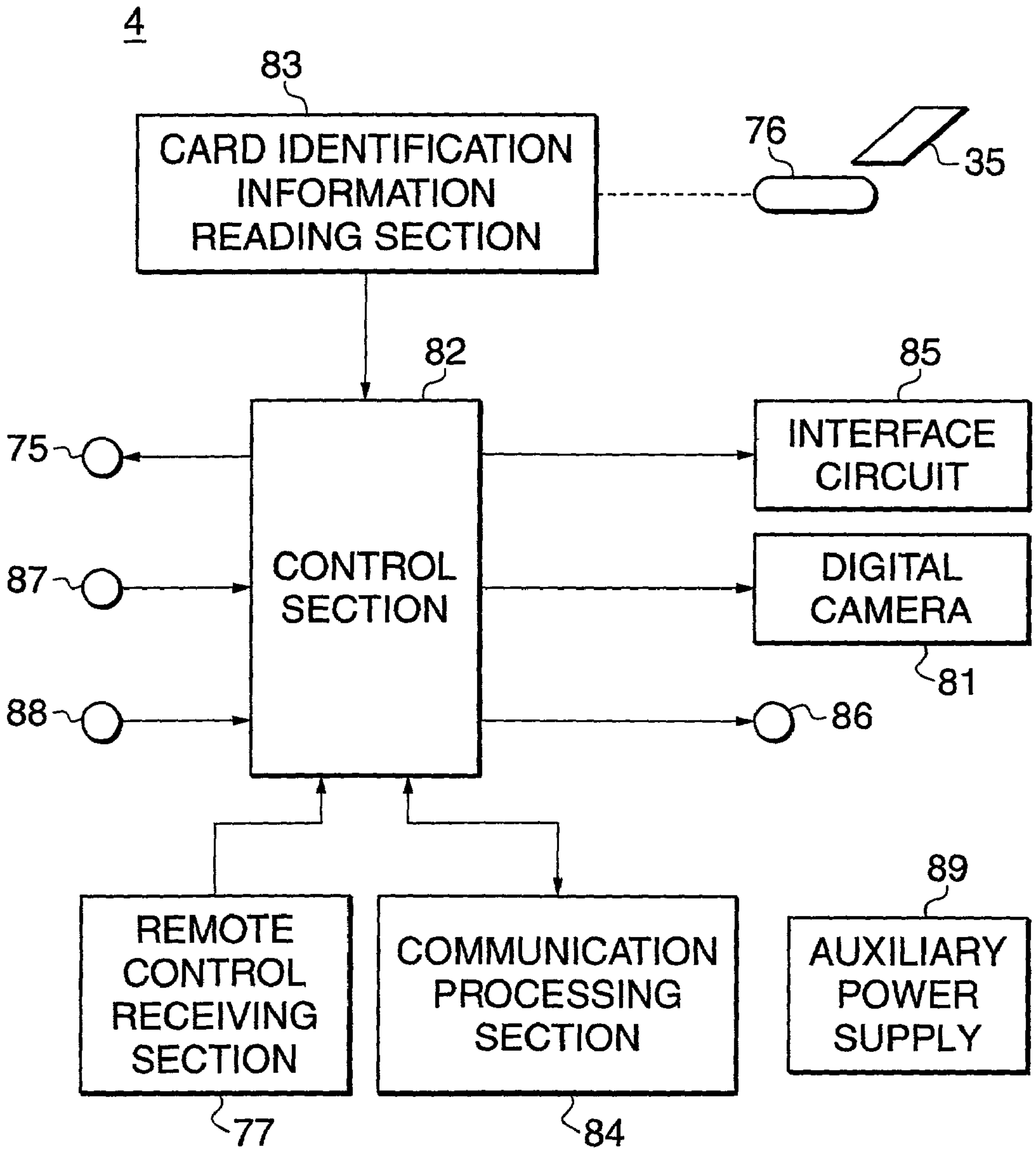
FIG. 7 is a detailed block diagram showing the constitution of the game ball supply command device 4 in an embodiment of the invention.

The game ball supply command device 4 also comprises, in addition to the above components, components as shown in the functional block diagram of FIG. 7: a digital camera 81, a control section 82, a card identifying information reading section 83, a communication processing section 84, an interface circuit 85, a light amount sensor 86, a door sensor 87, and a destruction sensor 88.

The status lamp 75 comprises for example plural lamps to indicate various statuses, by combinations of lighting up and blinking, such as one in which a game may be played by inserting a game ball supplying card 35 into the game ball supply command device 4 or one in which the game ball supplying card 35 is inserted. Lighting up, blinking, and turning off the status lamp 75 is controlled with the control section 82.

The card slot 76 is an opening through which the game ball supplying card 35 is inserted and discharged. To start a game with the pachinko game machine 5, the player must insert the game ball supplying card 35 into the card slot 76. The inserted game ball supplying card 35 is drawn in up to the position of the card identifying information reading section 83. The card identifying information reading section 83 reads the ID from the inserted game ball supplying card 35 and sends the read ID to the control section (made of a microcomputer or the like) 82 in the game ball supply command device 4. The ID is used to determine the authenticity of the game ball supplying card 35.

The remote control signal receiving section 77 is to notify the control section 82 of contents instructed by an employee using a remote control transmitter (not shown). In other words, it is arranged that the operation of the game ball supply command device 4 may be controlled by remote control communication, not through an entry section or various buttons.

The balance display section 78 provided on the pachinko game machine 5 comprises plural digits (for example three digits), seven segments for each, to indicate balance information on possible game ball supply related to the inserted game ball supplying card 35. Incidentally, the indicated balance for possible ball supply may be in money amount itself or the number of times obtained by dividing the money amount by a unit of money amount for one time.

The ball renting button 79 provided on the pachinko game machine 5 is to indicate supplying (renting) game balls for a unit. The return button 80 is to indicate giving back the game ball supplying card 35.

The interface circuit 85 of the game ball supply command device 4 has an interface function to exchange information with the pachinko game machine 5. Although not shown in FIGS. 6 and 7, a cheat sensor is provided inside the pachinko game machine 5 to detect electromagnetic waves, magnetic forces, or vibration used by a cheater in an attempt to swindle game balls. It is arranged that the information detected with the cheat sensor is also given through the interface circuit 85 to the control section 82 of the game ball supply command device 4.

The digital camera 81 of the game ball supply command device 4 is also for example a still camera such as a CCD camera or the like (it may also be one that takes images successively for a period of about five seconds) to take an image (or images for a certain duration) under the control of the control section 82 (in other words in response to an image-taking trigger signal given from the control section 82) and to give image signals to the control section 82. The direction of taking images with the digital camera 81 is such that the image of a person (player or employee) who operates the game ball supply command device 4 and the pachinko game machine 5 combined with the device 4 can be taken. Incidentally, the digital camera 81 may be provided with a flash lamp to light up under the control of the control section 82.

A light amount sensor 86 of similar function to that of the light amount sensor of the above-described devices is provided near the optical window portion 81*a* within the housing shown in FIG. 6 of the digital camera 81.

The communication processing section 84, the door sensor 87, and the destruction sensor 88 of the game ball supply command device 4 have similar functions to the functions of the counterparts of the devices already described above. Therefore, explanation of such functions is omitted.

The control section 82 is to control the entire game ball supply command device 4. Depending on the subjects of the control, the control section 82 also controls indirectly the pachinko game machine 5 combined with the game ball supply command device 4. The control function with the control section 82 is roughly divided into two. One is to control the game ball supply command using the game ball supplying card 35 and the other is to monitor anomaly. The control function of the control section 82 will be clarified later with the explanation of operation.

Although not shown in FIG. 7, it is arranged that power is automatically supplied to the set of the game ball supply command device 4 and the pachinko game machine 5 when the main power supply of the game facility is turned on. Or, it may be arranged that the set of the game ball supply command device 4 and the pachinko game machine 5 is provided with a power supply switch so that power is supplied from outside through a power supply line when the power supply switch is turned on.

In this embodiment, the set of the game ball supply command device 4 and the pachinko game machine 5 has a built-in auxiliary power supply 89 to supply power at least to the digital camera 81, the control section 82, the communication processing section 84, the interface circuit 85, the door sensor 87, the destruction sensor 88, and although not shown to a door sensor of the pachinko game machine 5, under the condition of power not supplied from the main power supply (for example at night). In other words, it is arranged to provide a minimum of anomaly monitoring function for the set of the game ball supply command device 4 and the pachinko game machine 5 with the auxiliary power supply 89 even if power is not supplied from the main power supply.

(A-1-4) Card Issuing and Account Settling Control Computer 6.

The card issuing and account settling control computer 6 is a computer device, placed for example in an office of the game facility, comprising a display and a keyboard to permit minimum work of data entry, with a main function of a database for accumulating data required in the game facility monitoring system 1. The accumulated data are related to various cards used in the game facility and to monitoring the game facility.

Figure 8:
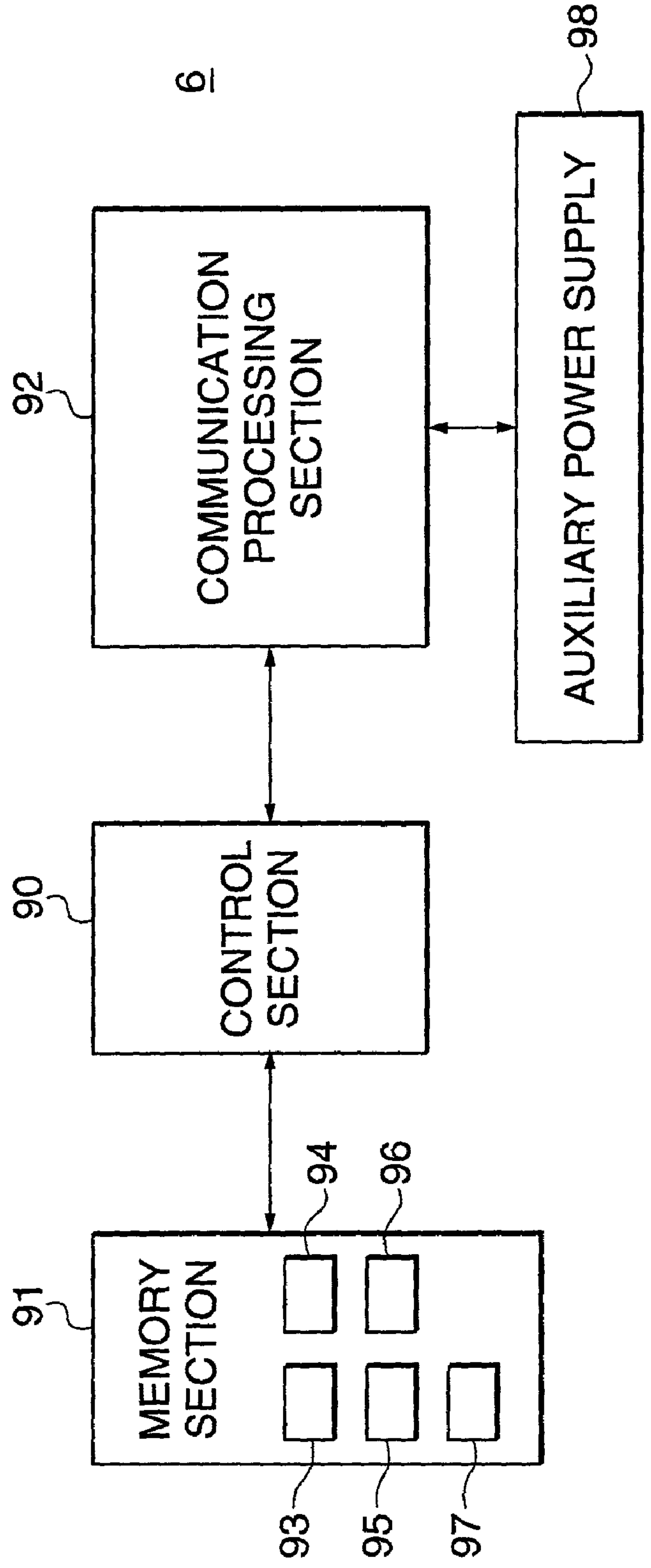
FIG. 8 is a block diagram showing the constitution of the card issuing and account settling control computer 6 in an embodiment of the invention.

The card issuing and account settling control computer 6 functionally comprises as shown in FIG. 8, a control section 90 (made of for example a microcomputer), a memory section 91 (made of a large capacity memory device such as a hard disk), and a communication processing section 92 (with entry section and display omitted in the drawing). Incidentally, the card issuing and account settling control computer 6 also has an auxiliary power supply 98 as well as a main power supply (not shown).

In the memory section 91 are stored, an entry card file 93, a game ball supply card file 94, a membership card file 95, an employee's card file 96, and an anomaly data file 97.

Figure 9:
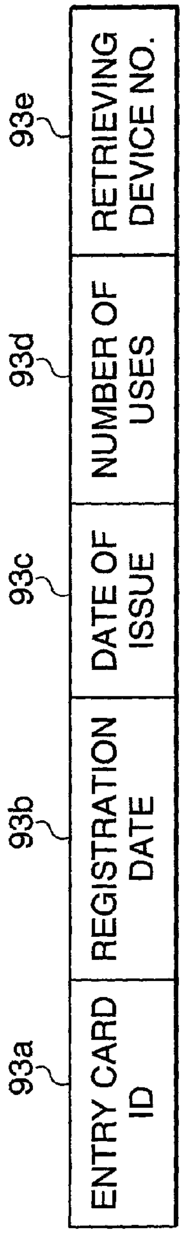
FIG. 9 is an explanatory drawing of the record constitution of the entry card file 93 in an embodiment of the invention.

As shown in FIG. 9, one record of the entry card file 93 has fields of the ID 93*a* of an entry card 10 currently handled in the game facility, the registration date (and time) 93*b* on which the record of the ID is registered in the file 93, the date of issue 93*c* in case it is issued, the number of issues (uses) 93*d* made so far with the entry card issuing machine 2, the serial number 93*e* of the game ball supplying card issuing and account settling machine 3 that retrieves the entry card 10.

Incidentally, data in respective fields 93*a* to 93*e* are not necessarily stored in successive addresses in the address space of the memory section 91. Although not shown in FIG. 9, control data are also present to make it possible to combine together the data of respective fields, so that they are handled as a single data.

Figure 10:
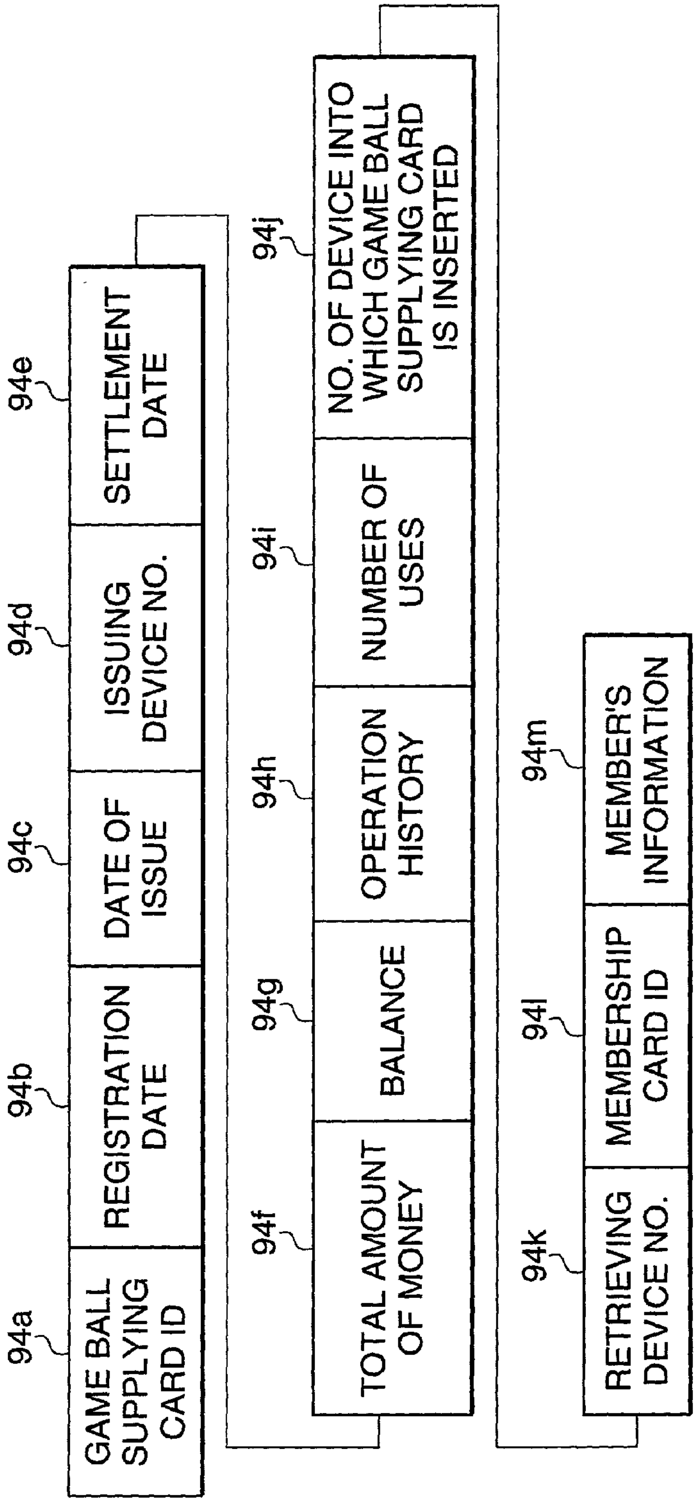
FIG. 10 is an explanatory drawing of the record constitution of the game ball supply card file 94 in an embodiment of the invention.

As shown in FIG. 10, one record of the game ball supply card file 94 has for example the following fields: the ID 94*a* of the game ball supplying card 35, the registration date (and time) 94*b* on which the record of the ID is registered in the file 94, the date (and time) of issue 94*c* in case it is issued, the serial number 94*d* of the game ball supplying card issuing and account settling machine 3 which issued the card, the settlement date (and time) 94*e*, the total amount of money 94*f* received on that day, the balance 94*g*, the operation history 94*h* from the issue of the game ball supplying card 35 to the settlement, the number of issues (uses) 94*i* made so far with the game ball supplying card issuing and account settling machine 3, whether or not the game ball supplying card 35 is inserted to any device and if inserted, the serial number 94*j* of the device into which the game ball supplying card 35 is inserted, the serial number 94*k* of the game ball supplying card issuing and account settling machine 3 that retrieves the game ball supplying card 35, the membership card ID 941 (member's ID) recorded when issued by the membership card 70, and the member's information 94*m*.

Incidentally, data in respective fields 94*a* to 94*m* are not necessarily stored in successive addresses in the address space of the memory section 91. Although not shown in FIG. 10, control data are also present to make it possible to combine together the data of respective fields, so that they are handled as a single data.

Figure 11:
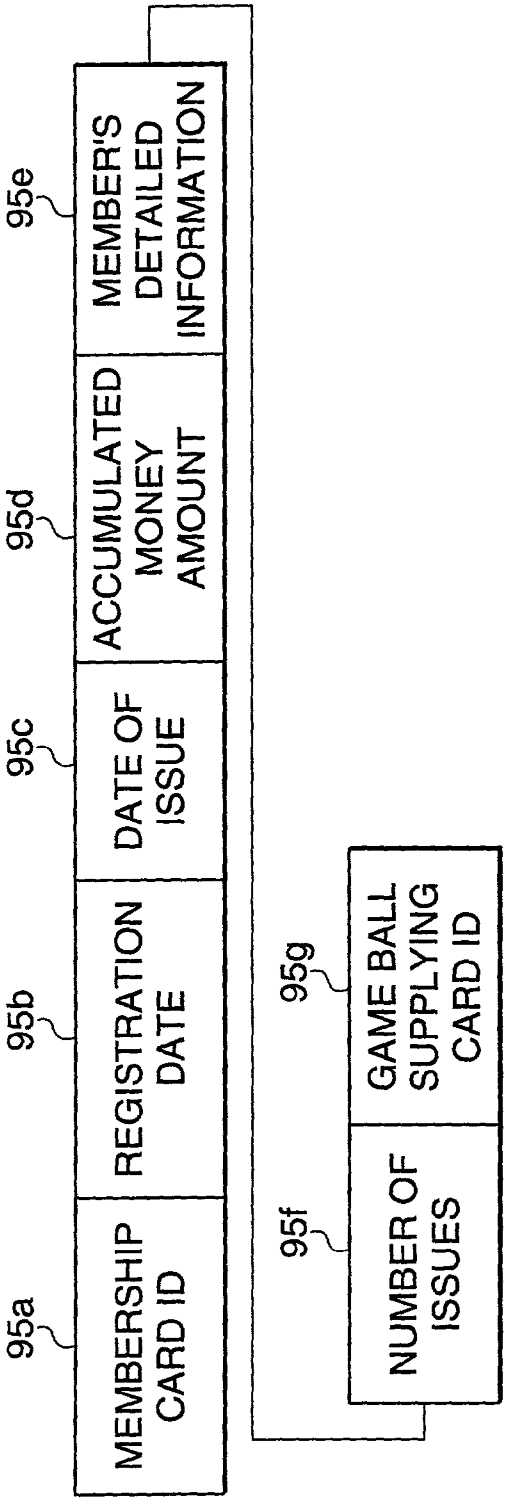
FIG. 11 is an explanatory drawing of the record constitution of the membership card file 95 in an embodiment of the invention.

As shown in FIG. 11, one record of the membership card file 95 has for example the following fields: the ID 95*a* of the membership card 70 currently handled in the game facility, the registration date (and time) 95*b* on which the record of the ID is registered in the file 95, the date (and time) of issue 95*c* in case the game ball supplying card 35 is issued, the accumulated money amount 95*d* put in by the member, the member's detailed information 95*e* such as address and name, the number of issues 95*f* of the game ball supplying card 35 made so far with the game ball supplying card issuing and account settling machine 3, and the ID 95*g* of the game ball supplying card 35 issued on that day as the membership card 70 is utilized.

Incidentally, data in respective fields 95*a* to 95*g* are not necessarily stored in successive addresses in the address space of the memory section 91. Although not shown in FIG. 11, control data are also present to make it possible to combine together the data of respective fields, so that they are handled as a single data.

Figure 12:
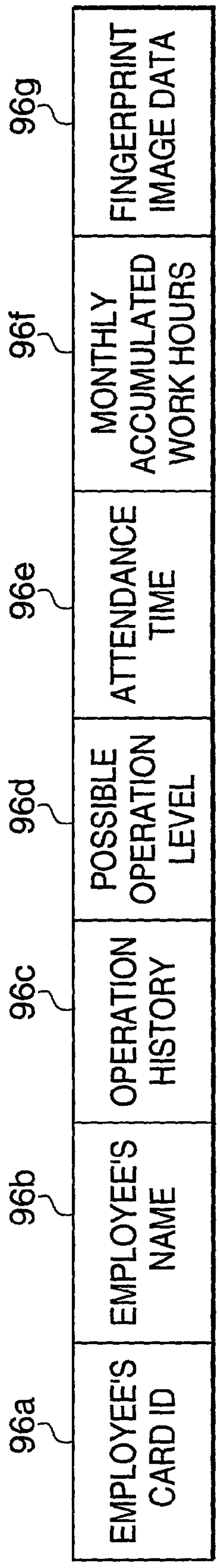
FIG. 12 is an explanatory drawing of the record constitution of the employee's card file 96 in an embodiment of the invention.

As shown in FIG. 12, one record of the employee's card file 96 has for example the following fields: the ID (including the employee's code of that day to be described later) 96*a* of the employee's card 71, the employee's name 96*b* carrying the employee's card 71, the operation history 96*c*, the possible operation level 96*d*, the attendance time 96*e* on that day, the accumulated work hours in that month 96*f*, and the fingerprint image data 96*g*. Many fields are provided for the operation history 96*c*, with each field recording the time duration from opening to closing the door of the game ball supplying card issuing and account settling machine 3, operation details, etc. In case other devices are operated, it may be arranged that insertion of the employee's card 71 is a condition. In that case, the history of operating the devices is also stored.

In the field 96*a* of the employee's card 71 are recorded the card ID and the employee's code of the day. The employee's code of the day is, as described later, made up of the employee's fixed code and a random number affixed to the fixed code, and recorded in the field 96*a* so that the card ID, the employee's fixed code, and the random number are easily separated.

Incidentally, data in respective fields 96*a* to 96*g* are not necessarily stored in successive addresses in the address space of the memory section 91. Although not shown in FIG. 12, control data are also present to make it possible to combine together the data of respective fields, so that they are handled as a single data.

Here, the large number of operation history data to be recorded in the operation history field 96*c* are recorded not in time sequence but under the control of the control section 90 in mixed sequence for example by interleaving or shuffling process using random numbers. It may also be arranged to record together with dummy data, or to store in the operation history field 96*c* the operation history data of the past that have been read and checked by the managing person of the game facility and so may be erased, so that a third person cannot find easily the operation history the third person wants to see.

In this embodiment, the control section 90 permits the contents of the operation history field 96*c* to be displayed on the display section on condition that a dedicated code of the entry section (a code that is known to limited persons such as an executive of the game facility or a managing person) is entered through the entry section. Displaying after searching according to the operation time or after arranging in different order is also conditioned on the entry of a different code.

Figure 13:
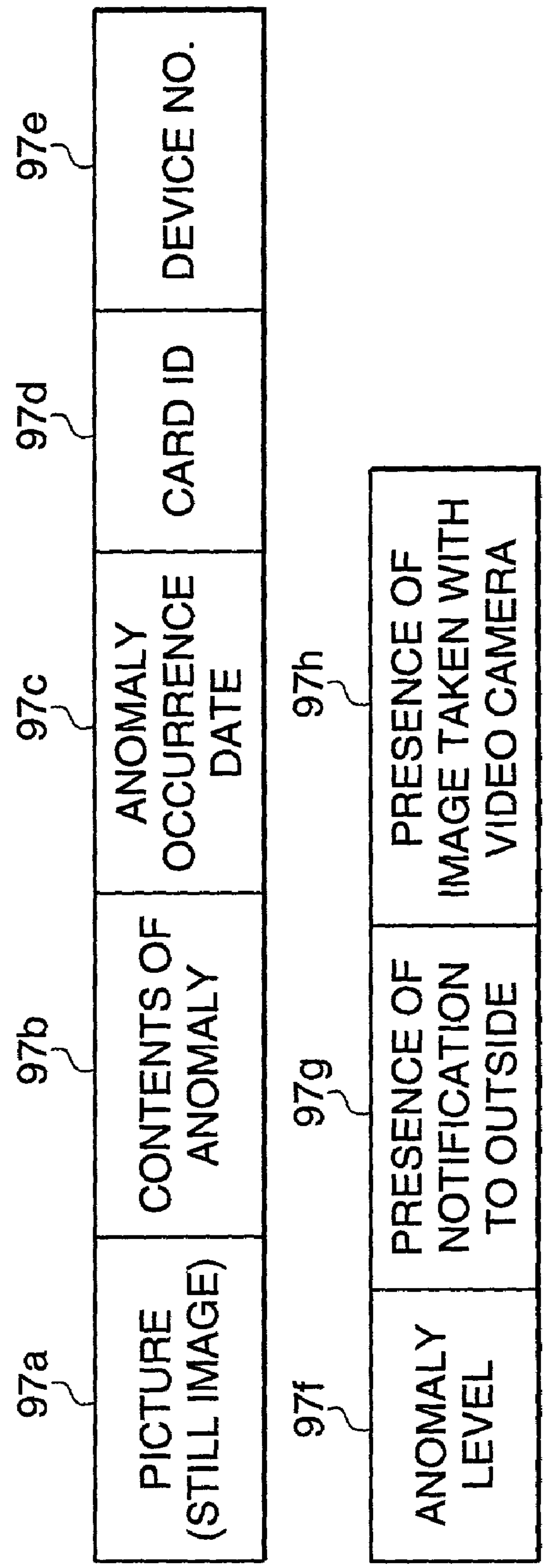
FIG. 13 is an explanatory drawing of the record constitution of the anomaly data file 97 in an embodiment of the invention.

As shown in FIG. 13, one record of the anomaly data file 97 has for example the following fields: the picture data (still image data) 97*a* (picture data may not be present depending on the type of the anomaly), the contents of anomaly 97*b* (it may happen to be an event which has become a trigger for obtaining the picture data), the date and time 97*c* of occurrence of the anomaly, the card ID 97*d* considered to be related to the person (player or employee) related to the anomaly, the serial number 97*e* of the device in which the anomaly has occurred, the level of the anomaly 97*f* occurred, whether or not the anomaly has been notified 97*g* to an outside system such as the security company, and whether or not images are taken 97*h* with the video camera 9.

Incidentally, data in respective fields 97*a* to 97*h* are not necessarily stored in successive addresses in the address space of the memory section 91. Although not shown in FIG. 13, control data are also present to make it possible to combine together the data of respective fields, so that they are handled as a single data.

Here, the large number of records about the anomaly data file 97 are recorded not in the order of the anomaly occurrence date and time but under the control of the control section 90 in mixed sequence using for example interleaving or shuffling process using random numbers. It may also be arranged to record together with dummy data, or to store in the anomaly data file 97 the anomaly data records of the past that have been read and checked by the managing person of the game facility and so may be erased, so that a third person cannot find easily the anomaly data the third person wants to see.

This embodiment is arranged that the control section 90 shows the contents in the anomaly data file 97 on the display section on condition of entering a code special to the entry section (a code that is known only to such persons as an executive of the game facility or a managing person). To search and put in different order according to the time and date of occurrence and to display, entry of a different code is also required as a condition.

As described above, the operation history in the employee's card file 96 and the records in the anomaly data file 97 are arranged that general employees cannot see them on the display or cannot erase them as a matter of course.

Incidentally, since the operation history in the employee's card file 96 and the records in the anomaly data file 97 may become large in number, it may be arranged that data are compressed at the time of recording and expanded at the time of reproduction.

Further details of data in the fields 97*a* to 97*h* in the anomaly data file 97 are described below.

The picture data related to the field 97*a* are basically still picture data taken with the digital cameras provided in the entry card issuing machine 2, the game ball supplying card issuing and account settling machine 3, or the game ball supply command device 4. In case pictures are taken for several seconds depending on the nature of the anomaly (depending on the type of the picture taking trigger), the data may be for successive images over a short period of time. It may happen that images cannot be taken with cameras in case anomalies occur for example at night. In that case, no picture data are recorded. Picture data of anomalies occurring at night may be obtained with a camera with a flashing function. Here, the picture data stored may be raw image data as taken with the digital camera or compressed data. In the latter case, the compression may be performed with either the control section of the picture taking device or the control section 90 of the card issuing and account settling control computer 6.

The recorded contents of anomaly related to the field 97*b* are those which identify the types of anomaly. By the way, even when operation is normal, data that are necessary for the analysis of anomalies which occur later are recorded. In that case, the contents are recorded as being normal. Most of the contents indicate the causes (events) that caused the digital camera to take pictures.

The events that trigger taking pictures may be roughly divided into those which cause triggers to be produced with devices with a digital camera mounted (for the game ball supply command device 4, including the pachinko game machines 5 which make up a set) and those which cause triggers to be produced with devices without a digital camera mounted (mainly the system control computer 7).

The device provided with a digital camera produces a trigger for example, (1) when a specified sensor (a destruction sensor, a cheat sensor, a door sensor or the like) works, (2) when anomaly is recognized with causes other than the sensor's output (such as a wrong card as a result of collation), and (3) when an entry card 20 or a game ball supplying card 35 is issued wrongly.

The cases in which triggers are produced with a device without a digital camera may be divided into (1) those in which triggers are produced automatically, and (2) those in which triggers are produced by manual operation by a managing person of the game facility. The triggers are automatically produced for example, when the system control computer 7 detects an anomaly in the number of discharged game balls from a pachinko game machine 5 (abnormally large number of game balls discharged when not in a big hit, or unusual game ball discharge suspected to have resulted from the use of a fake ROM of a big hit), or when the light amount sensor 86 of a game ball supply command device 4 detects anomaly and gives a trigger signal to another game ball supply command device 4 located in an opposite position. Manual operation by a managing person of the game facility is made to the system control computer 7.

The anomaly occurrence date and time data related to the field 97*c* represent the date and time of occurrence of anomalies (and the date and time of the end of normal operations), preferably specified to the second in time.

The card ID related to the field 97*d* is that of the entry card 20, the game ball supplying card 35, the membership card 70, or the employee's card 71.

For example, if an image is taken in response to the actuation of the cheat sensor of a set-forming pachinko game machine 5 under the condition of the game ball supplying card 35 being inserted into the game ball supply command device 4, the ID of the game ball supplying card 35 is recorded. Also for example, if an image is taken when a game ball supplying card 35 is issued as an authentic membership card 70 is inserted into the game ball supplying card issuing and account settling machine 3, both IDs of the cards 35 and 70 are recorded.

The serial number of the device related to the field 97*e* is the ID of the device in which an anomaly occurs. The ID may be that of the device with the digital camera which has taken the pictures or that of the digital camera. It may also be arranged to record together the ID of the sensor that has outputted a detection signal, a trigger for taking pictures.

The anomalies occurring in relation to the field 97*f* are recorded with anomaly levels determined by the type of anomaly. For example, the anomalies are classified into four levels from 0 to 3. The level 0 represents a normal state. The level 1 is one that represents a normal state requiring confirmation. The level 2 is a doubtful one that, though abnormal, cannot be attributable to illegal or fraudulent acts, such as mistakes done by employees or players. The level 3 is one that is almost certainly attributable to illegal or fraudulent acts. Therefore, the level 1 may be referred to as a normal attention level, the level 2 as a caution level, and the level 3 as a warning level.

The information on outward notification 97*g* related to the field 97*g* represents whether or not an anomaly notification has been given to an outside system such as a security company, and may include information on the notification addressee. For example, it may be arranged that an anomaly of the level 3 occurring at night is notified to an outside system.

The information on taking images with the video camera 9 related to the field 97*h* shows whether or not images have been taken with the video camera 9 in response to the anomaly that has occurred this time. In case plural video cameras 9 are provided, the information also includes one denoting a definite video camera 9.

The card issuing and account settling control computer 6, upon requests for collation from the entry card issuing machine 2, the game ball supplying card issuing and account settling machine 3, the game ball supply command device 4, the employee's card device 8 or the like, gains access to corresponding files and returns the results, or updates information in the above files according to information sent from the above-enumerated devices. The control section 90, when an anomaly is determined as a result of collation, returns a reply to that effect and also records to that effect in the memory section 91.

Though not shown in FIG. 8, it is arranged that power is automatically supplied to the card issuing and account settling control computer 6 when the main power supply of the game facility is turned on. It may alternatively be arranged that the card issuing and account settling control computer 6 is provided with a power supply switch so that power is supplied from outside through a power supply line when the power supply switch is turned on.

In this embodiment, the card issuing and account settling control computer 6 has a built-in auxiliary power supply 98 to supply power to the communication processing section 92 under the condition of power not supplied from the main power source (for example at night), and it is arranged that power is supplied from the auxiliary power supply 98 to the entire card issuing and account settling control computer 6 when the communication processing section 92 receives anomaly occurrence information from an external device. In other words, it is arranged to implement a minimum of anomaly monitoring with the auxiliary power supply 98 even if power is not supplied from the main power source.

Incidentally, it may also be arranged that the card issuing and account settling control computer 6 is connected through a network different from the network N of the game facility so that a third party (such as a card issuing company or a card supplier company) can gain access to make judgment on replenishing various cards from a distant place.

(A-1-5) System Control Computer 7.

The system control computer 7 is made of a computer device placed for example in an office of the game facility. The computer device is for example a personal computer having communicating function for the executives or the managers of the game facility to control the entire monitoring system and the card system. It controls the card system including the control of the number of devices such as the game ball supplying card issuing and account settling machine 3 and the game ball supply command device 4, their addresses on the communication network, parameter setting, and monitoring them. Moreover, the system control computer 7 may be connected to a conventional hall control computer (not shown) that controls information on the ball discharge from the pachinko game machine 5 and on the member's cards 70. Or, those systems may be integrated in the system control computer 7. The following description assumes the latter.

Figure 14:
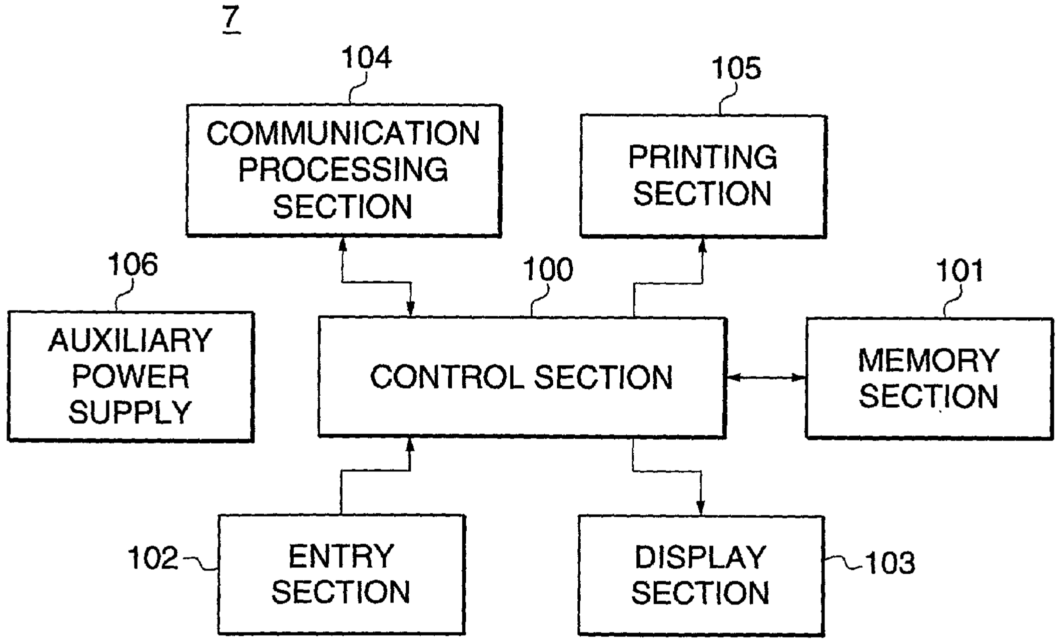
FIG. 14 is a detailed block diagram showing the constitution of the system control computer 7 in an embodiment of the invention.

As described above, the system control computer 7 is made of the computer device, and has, as shown in FIG. 14, a control section 100, a memory section 101, an input (entry) section 102, a display section 103, a communication processing section 104, and a printing section 105.

The system control computer 7, in relation to the above-mentioned various cards, updates individually the contents of various card files of the card issuing and account settling control computer 6 in response to operations made to the entry section 102 by a managing person or the like. It also records information on the appearance of a wrong card (anomaly) and issues warning.

The system control computer 7, in terms of monitoring function, instructs digital cameras provided in various devices and the video camera 9 to take pictures. For example, it instructs any of the digital cameras to take pictures according to the operation made to the entry section 102 by a managing person, or instructs the digital camera 81 of the game ball supply command device 4 to take pictures related to the pachinko game machine 5 which has discharged an unusually large number of balls.

The system control computer 7 has also the function of search in the anomaly data file 97 in terms of monitoring function. For example, it searches data of specified pictures in response to the operation of entering search conditions through the entry section 102 by a managing person or the like. The search function may be started automatically. For example, in case a cheat sensor detects a cheat, all the picture data related to the game ball supplying card 35 inserted in the game ball supply command device 4 paired with the pachinko game machine 5 in question are searched using the ID of the game ball supplying card 35 as a key.

The system control computer 7 is also provided with an auxiliary power supply 106 having the same function as that of the auxiliary power supply in the card issuing and account settling control computer 6.

(A-1-6) Employee's Card Device 8.

The employee's card device 8 issues employee's cards 71 to be carried by employees who are allowed to be operators of the game ball supplying card issuing and account settling machine 3 or the like, and retrieves the employee's cards 71 issued. The employee's card device 8 also has the function of a time clock. An employee's card 71 is issued when an employee attends the day's work and is retrieved when the employee leaves the work site.

Figure 15:
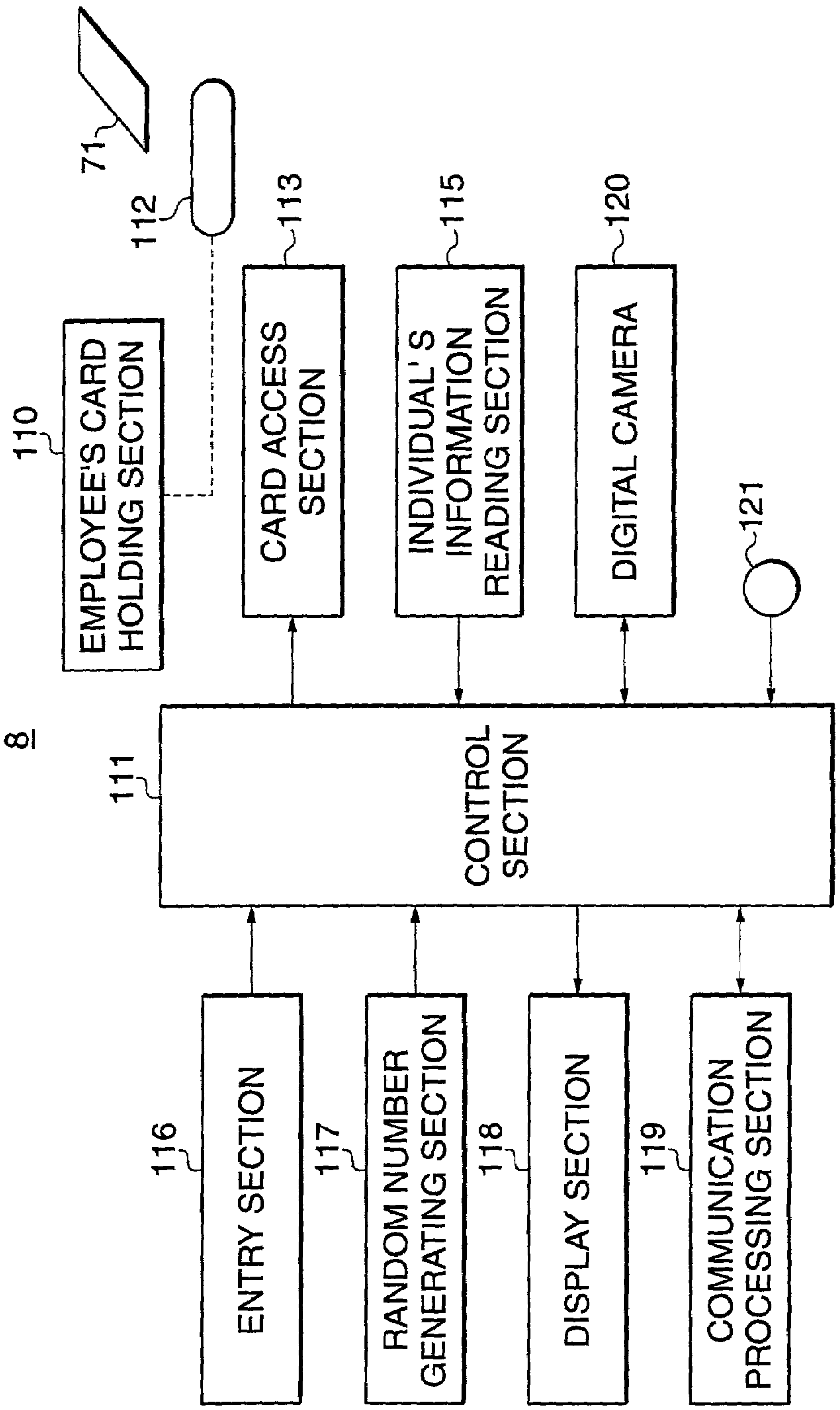
FIG. 15 is a detailed block diagram showing the constitution of the employee's card device 8 in an embodiment of the invention.

FIG. 15 is an explanatory view of the functional constitution of the employee's card device 8. It shows not only an electrical functional constitution but also a mechanical functional one.

The employee's card device 8 has an employee's card holding section 110 for storing the employee's cards 71. The holding section 110 is to roll out the stored employee's cards 71 and to retrieve the employee's cards 71 inserted through the card slot 112, under the control of the control section 111.

An employee's card access section 113 is provided on the transfer passage of the employee's cards 71 between the employee's card holding section 110 and the card slot 112. The employee's card access section 113 is to store information on and erase information from the employee's card 71 under the control of the control section 111. In this embodiment, the card ID only is stored on the employee's card 71 held in the employee's card holding section 110, and the employee's code or the like is not stored. The employee's card access section 113 stores on the employee's card 71 being issued for example the employee's fixed code with a random number and erases the employee's fixed code together with the affixed random number from the employee's card 71 being retrieved.

The employee's card device 8 has an individual's body information reading section 115 for checking the identity of the employee.

The individual's information reading section 115 is made up of for example a fingerprint reading device, a palm print reading device, and an iris reading device, and gives the read individual information (fingerprint, palm print, or iris information; image information) to the control section 111. Collation of the read individual information with pre-registered information (identifying employees) is performed with the control section 111 or the card issuing and account settling control computer 6.

The employee's card device 8 has an entry section 116, a random number generating section 117, a display section 118, a communication processing section 119 and the like. A timer for determining date and time is assumed to be included in the control section 111.

The entry section 116 has for example plural keys for use by an operator to enter certain information (such as the employee's fixed code) into the employee's card device 8. The entered information is given to the control section 111.

The random number generating section 117 generates random numbers under the control of the control section 111 and gives the generated random number to the control section 111. While an employee's fixed code is allocated to each employee, it is arranged that, when an employee's card 71 is issued as the employee attends the day's work, a random number is produced and affixed to the employee's fixed code and stored on the employee's card 71, so that the employee's fixed code with the random number affixed is the employee's code on the employee's card 71 issued (namely the employee's code of the day).

The display section 118 displays under the control of the control section 111 a guidance message prompting an operator to operate, or information on the state of the employee's card device 8.

The communication processing section 119 performs communication through the dedicated line N with devices such as the card issuing and account settling control computer 6, the system control computer 7 and the like under the control of the control section 111.

The control section 111 is made of for example a microcomputer to control the entire employee's card device 8. The contents of the control will be clarified later in the description of the operation.

Also the employee's card device 8 is provided with a digital camera 120 and a light amount sensor 121 having similar function to the devices already described.

(A-1-7) Video Camera 9.

The video camera 9 is to take internal pictures of the game facility hall and the game facility control room. FIG. 1 shows only one of the plural video cameras 9 actually provided. While detailed constitution of the video camera 9 is not shown, this embodiment is provided with a moving mechanism to change the photographing direction and a mechanism to take pictures in response to remote controlled photographing instruction from the system control computer 7. Generally, dim lighting is done for security even in an unattended condition at night in game facility halls. The video camera is preferably capable of taking pictures under such a condition.

(A-2) Operation of the Embodiment System, and Operation by Players and Employees.

Next, operation of various sections of the game facility monitoring system 1 of the embodiment will be described together with the operation by employees and players. The following description is made mainly on the assumption that main power is being supplied to each device.

(A-2-1) Operation When Employees Come to the Workplace.

Figure 16:
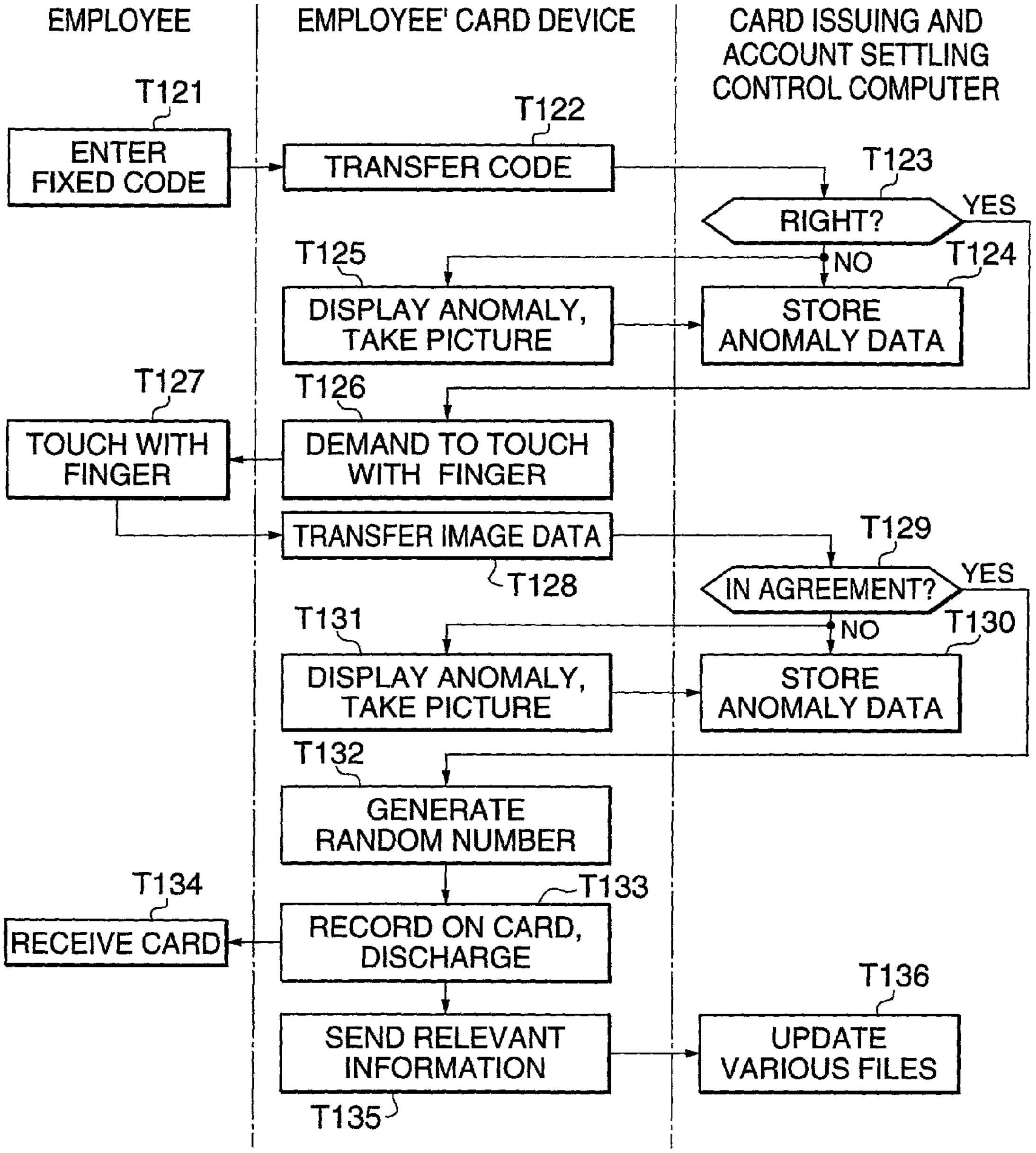
FIG. 16 is a sequence diagram of operation when an employee comes to the workplace in an embodiment of the invention.

First, the operation when an employee comes to the workplace is described in reference to the sequence diagram shown in FIG. 16.

The control section 111 of the employee's card device 8 in its standby state causes the display section 118 to display a message demanding the entry of the employee's fixed code. The employee, upon coming to the workplace, uses the entry section 116 to enter the employee's own fixed code (T121).

At this time, the control section 111 transfers the employee's fixed code through a communication processing section 119 to the card issuing and account settling control computer 6 to have its authenticity checked (T122, T123).

In case the employee's fixed code entered is wrong, the card issuing and account settling control computer 6 sends the information to that effect to the employee's card device 8 or to the system control computer 7 (not shown in FIG. 16). The employee's card device 8 displays a message of anomaly (if a buzzer is provided, sound notification is given as well as the visual message; likewise with other devices), a picture is taken with a digital camera 120, the display is returned to a standby state, and the card issuing and account settling control computer 6 adds anomaly occurrence data including picture data to the anomaly data file 97 (T124, T125). At the time of this addition, shuffling and interleaving are done as described before. Incidentally, since incorrect entry of the employee's fixed code can occur, the anomaly level of this case is level 2 (the caution level). It may also be arranged that the picture data obtained by taking pictures when an anomaly occurs are automatically printed if the main power is being supplied to the system control computer 7.

In the system computer 7 to which a notification is given that the code is wrong, an anomaly notification process of the level 2, not shown in FIG. 16, is performed, and whether or not searching picture data is necessary is determined. It may also be arranged that the system control computer 7 causes the video camera 9 to take a picture of the person who entered a wrong employee's fixed code. It is further arranged that the system control computer 7 starts taking pictures with the video camera 9 under the condition in which the data of an anomaly level other than 0 are added to the anomaly data file 97. Therefore, the start of taking pictures with the video camera 9 is not mentioned repeatedly in the following explanation.

When an anomaly notification of the level 2 is given with the system control computer 7, the game facility manager or the like person, if there is no other urgent task, takes out the data about the anomaly from the anomaly data file 97 and checks them. Even if the anomaly data are taken out, checked, and the anomaly data need not be recorded any more, the anomaly data are still left recorded so as to disturb a third party who attempts to take out the other anomaly data. The amount of such past anomaly data to be left for the above purpose is for example for several days or one week.

Incidentally, the above process is also performed when other anomaly data are added. Therefore, the process is not mentioned repeatedly in the following explanation.

On the other hand, when the employee's fixed code entered is right, a notification to that effect is given from the card issuing and account settling control computer 6 to the employee's card device 8, the control section 111 causes the display section 118 to display a message prompting the employee to bring his or her finger into contact with the individual's information reading section (here it is assumed to be a fingerprint reading device) 115 (T126). Accordingly, the employee has the image of his or her finger read with the individual's information reading section 115. The control section 111 transfers the fingerprint image data through the communication processing section 119 to the card issuing and account settling control computer 6 to have it verified whether or not it corresponds to the employee's fixed code (T127 to T129).

When the fingerprint image data are in disagreement with those registered, the card issuing and account settling control computer 6 sends signals to that effect to the employee's card device 8 and to the system control computer 7 (not shown in FIG. 16). The employee's card device 8 displays a message of anomaly, causes the digital camera 120 to take pictures. The card issuing and account settling control computer 6 adds the anomaly data including the picture data to the anomaly data file 97 (T130, T131). Incidentally, since it may happen to touch with a wrong finger, the level of anomaly in this case may be set to 2 (caution level). Or, the anomaly level may be set to 3 (warning level) assuming that an attempt is made to obtain fraudulently an employee's card 71.

In the system control computer 7 to which a notification is given that the fingerprint image data do not agree with those registered, although the process is not shown in FIG. 16, an anomaly notification process of the level 2 or 3 is performed, and whether or not searching picture data is necessary is determined. It may also be arranged that the system control computer 7 causes the video camera 9 to take a picture of the person who made a wrong fingerprint read. In case an anomaly notification of the level 3 is given, the game facility manager or the like person is to take immediate measures.

On the other hand, if the fingerprint image data are right, a notification to that effect is given from the card issuing and account settling control computer 6 to the employee's card device 8, the control section 111 causes the random number generating section 117 to generate a random number and simultaneously takes current time data (work attendance time data) from a built-in timer (T132).

And the control section 111 causes the employee's card holding section 110 to roll out an employee's card 71, obtains the ID of the rolled out employee's card 71 from the employee's card access section 113, causes the employee's card access section 113 to store on the rolled out employee's card 71 the employee's code of the day made up of the employee's fixed code with a generated random number affixed and the work attendance time, and causes the employee's card 71 to be discharged through the card slot 112. The employee receives the employee's card 71 (T133, T134).

The control section 111 causes the card issuing and account settling control computer 6 to transfer and store in the anomaly data file 97: the ID of the rolled out employee's card 71, the day's employee's code made up of the employee's fixed code with a generated random number affixed, the work attendance time, and the picture data taken at that time with the digital camera 120 (T135, T136). Since the employee's card 71 in this case is issued through a correct procedure, the anomaly level is set to 0. Incidentally, in case the employee's card device 8 is placed in a position that cannot be seen from the other persons, the anomaly level may be set to 1 (normal attention level).

(A-2-2) Operation When a Non-Membership Player Enters a Game Shop.

Next, the operation of a non-membership player will be described from the time when the player enters the game facility to the time when the player obtains a game ball supplying card in reference to the sequence diagram shown in FIG. 17.

When a non-membership player enters the game shop, he or she first pushes a card issuing button 10 of the entry card issuing machine 2 (T0). At this time, the entry card issuing machine 2 rolls out one of the entry cards 20 it holds, and takes a picture with the digital camera 16. The non-membership player receives the entry card 20 rolled out (T1, T2). At this time, the ID (and information on the date and time of issue) of the entry card 20 and picture data and the like are sent from the entry card issuing machine 2 to the card issuing and account settling control computer 6 and, in response to it, the anomaly data file 97 and the entry card file 93 of the card issuing and account settling control computer 6 are updated (T3). Since the process is only to issue the entry card 20, the anomaly level is set to 0. The anomaly level may also be set to level 1 (normal attention level) in consideration that the entry card 20 is a condition for issuing the game ball supplying card 35.

The non-membership player who obtained the entry card 20 inserts it into the game ball supplying card issuing and account settling machine 3 placed near the pachinko game machine 5 the player wants to play with (T4). The game ball supplying card issuing and account settling machine 3 obtains the ID of the inserted entry card 20 with the card information reading section 56 and sends the ID to the card issuing and account settling control computer 6, which in turn refers to the contents in the entry card file 93 to check if the card 20 is right (T5, T6).

For example, in case no record of issue remains for the entry card 20, or a specified period of time (for example 2 hours) has passed from the date and time of issue of the entry card 20 (including the issue before the previous day as a matter of course), the card issuing and account settling control computer 6 determines that the card is not right.

Figure 17A:
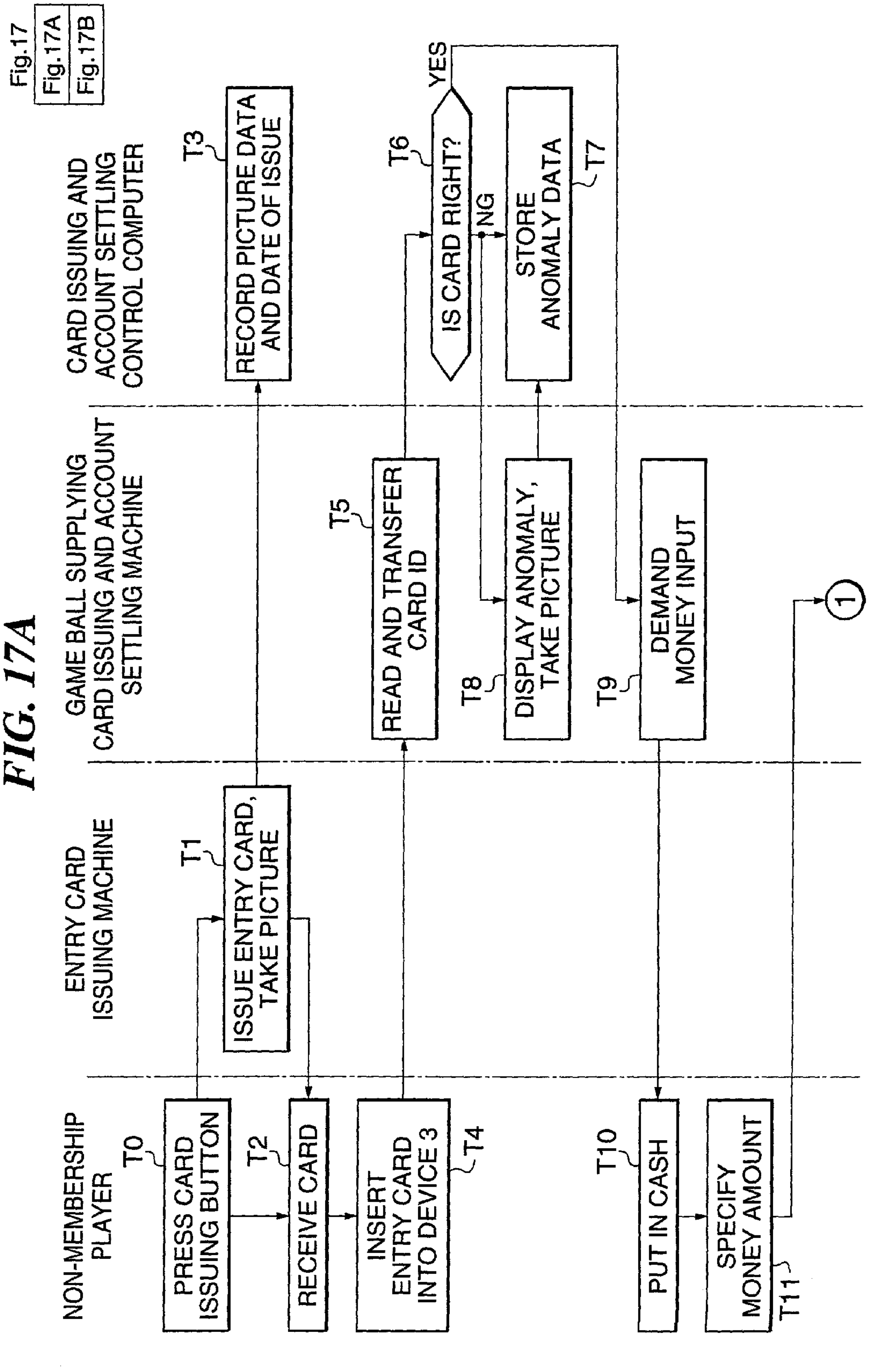
FIG. 17 is a sequence diagram of operation when a player enters a game shop in an embodiment of the invention.
Figure 17B:
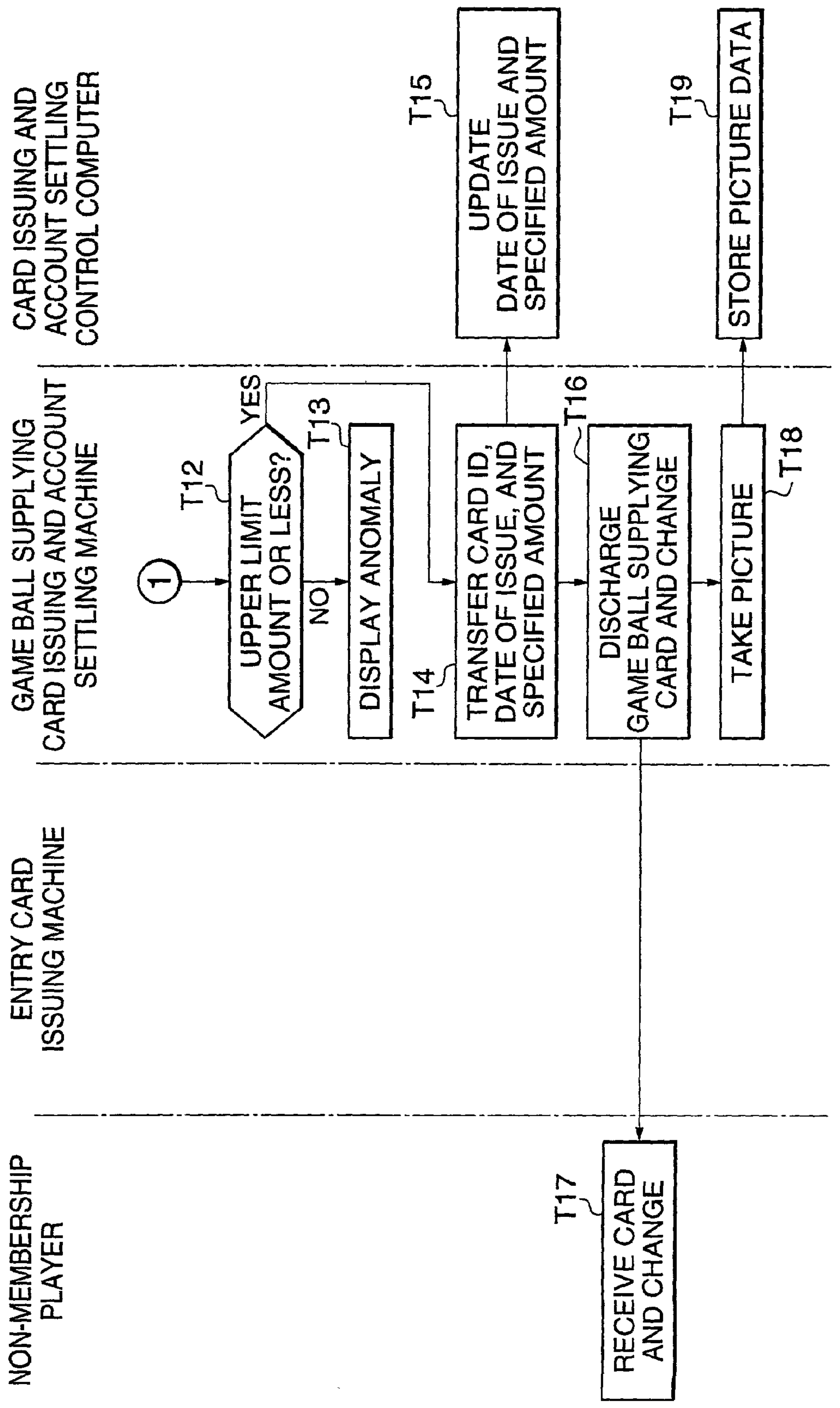

If the card is not right, the card issuing and account settling control computer 6 sends information to that effect to the game ball supplying card issuing and account settling machine 3 and the system control computer 7 (not shown in FIG. 17). The game ball supplying card issuing and account settling machine 3 displays a message of anomaly. The digital camera 52 takes a picture. The card issuing and account settling control computer 6 adds anomaly occurrence data to the anomaly data file 97 (T7, T8). In this case, the level of anomaly is set for example to level 2 (caution level).

In the system control computer 7 to which a notification is given that the card is not right, although the process is not shown in FIG. 17, an anomaly notification process of the level 2 is performed, and whether or not searching picture data is necessary is determined. For example, when the reason for not being right is that a specified period of time (for example 2 hours) has passed from the date and time of issue of the entry card 20, picture data at the time of the issue of the entry card 20 are automatically searched from the anomaly data file 97. Incidentally, since the entry card 20 has no monetary value, the automatic picture data searching function may not be provided.

In case the entry card 20 is right, the card issuing and account settling control computer 6 sends information to that effect back to the game ball supplying card issuing and account settling machine 3 which in turn displays a message of prompting the player to put in money (T9).

In response to that, the non-membership player inserts a bill or bills into the game ball supplying card issuing and account settling machine 3 and specifies a prepaid amount (possible supply balance, may be in the number of times) using the selection button 39 (T10, T11).

Though not shown in FIG. 17, when the inserted bill is a counterfeit one, a picture is taken with the digital camera 52, data are added to the anomaly data file 97 of the card issuing and account settling control computer 6, and anomaly notification of a specified anomaly level is made with the system control computer 7. The managing person or the like appropriately causes the printing section 105 of the system control computer 7 to print the picture data.

The game ball supplying card issuing and account settling machine 3, in case a possible supply balance is specified that is greater than the amount of bill or bills inserted, indicates an instruction to redo the specification (T12, T13).

The game ball supplying card issuing and account settling machine 3, in case a possible supply balance is specified that is smaller than the amount of bill or bills inserted, obtains with the card information reading section 56 information such as the ID, date and time of issue, and balance of the game ball supplying card 35 which is about to be discharged, and transfers the information to the card issuing and account settling control computer 6. In response, the card issuing and account settling control computer 6 updates the contents in the game ball supply-purpose card file 94, etc. (T14, T15). At this time, the inserted entry card 20 is retrieved into the entry card retrieving section 57.

The game ball supplying card issuing and account settling machine 3 discharges the stored game ball supplying card 35 and, if necessary, discharges change (T16), and the non-membership player receives them (T17). The game ball supplying card issuing and account settling machine 3 when discharging the game ball supplying card 35 takes pictures with the digital camera 52 and transfers picture data to the card issuing and account settling control computer 6. The card issuing and account settling control computer 6 adds the data to the anomaly data file 97 (T18, T19). Here, since the process is a normal issue of the game ball supplying card 35, the anomaly level is set to level 0.

On the other hand, a membership player, when entering the game shop, without obtaining an entry card 20, inserts a membership card 70 in the game ball supplying card issuing and account settling machine 3 placed near the pachinko game machine 5 the player wants to play with. The operation of the device and the actions of the player after the membership card 70 is inserted are nearly the same as those occurring when the entry card 20 is inserted, and so their explanations are omitted (also a sequence diagram is omitted).

Incidentally, a membership card 70 is determined to be wrong when the fixed ID of the membership card is not registered in the card issuing and account settling control computer 6 or when the membership contract period, if any, has expired or when a game ball supplying card 35 has already been issued on that day.

(A-2-3) Money Adding Actions

Next will be described actions for increasing the balance for the possible supply of game balls in reference to the sequence diagram shown in FIG. 18.

When the player wants to increase the balance for possible ball supply as the balance becomes low (or zero), he or she inserts a game ball supplying card 35 into the game ball supplying card issuing and account settling machine 3 (T20). The game ball supplying card issuing and account settling machine 3 obtains the ID of the inserted game ball supplying card 35 through the card information reading section 56 and transfers it to the card issuing and account settling control computer 6 (T21). The card issuing and account settling control computer 6 refers to the contents in the game ball supply card file 94 to check the ID for authenticity (T22).

The game ball supplying card 35 is determined to be wrong when for example its registration record does not exist any more, its date of issue is not that day but someday in the past, or its ID is the same as an ID of a game ball supplying card 35 already inserted in some other game ball supply command device 4 or in other game ball supplying card issuing and account settling machine 3.

Figure 18:
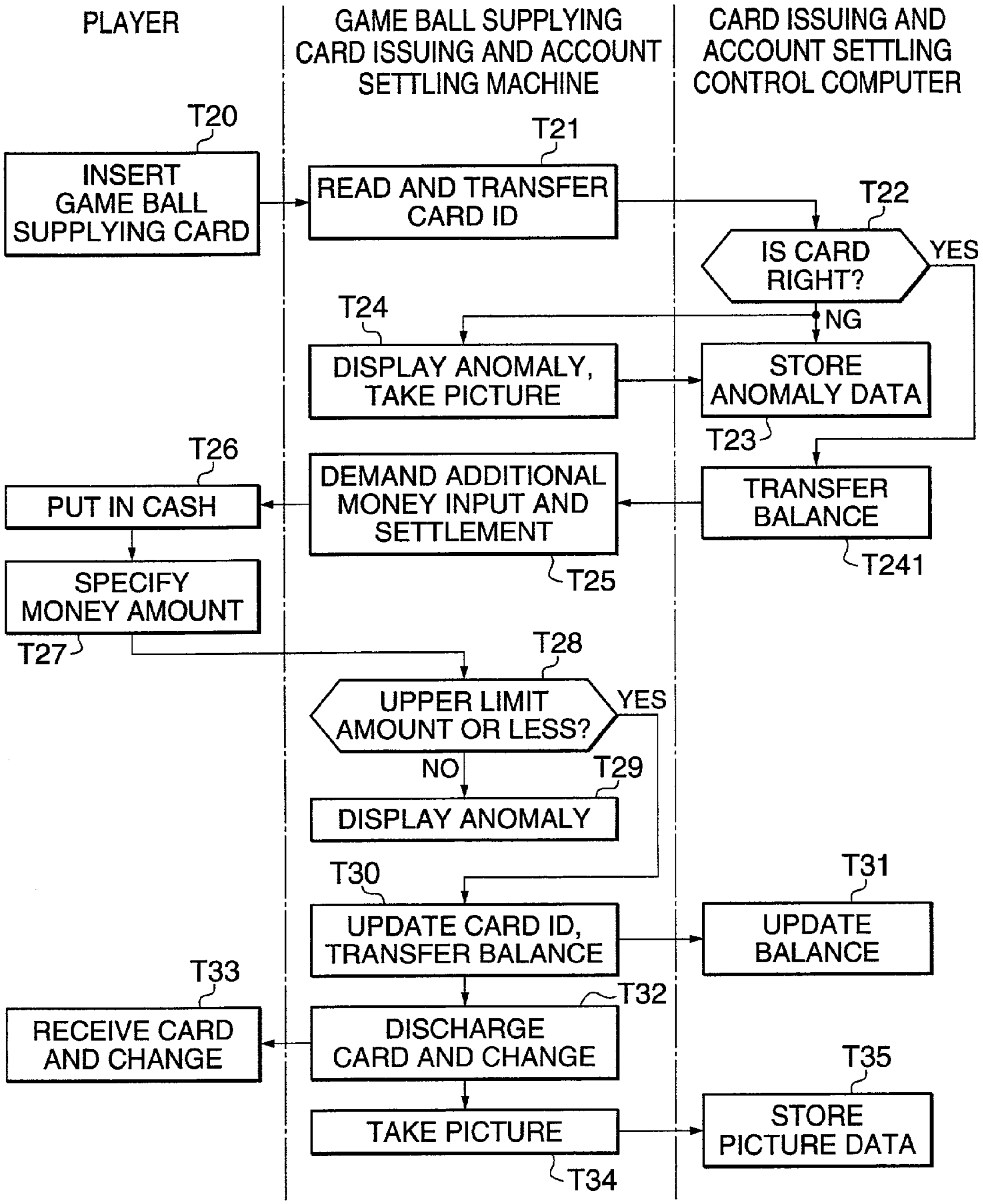
FIG. 18 is a sequence diagram of operation when putting in additional money in an embodiment of the invention.

If it is wrong, the card issuing and account settling control computer 6 sends signals to that effect to the game ball supplying card issuing and account settling machine 3 and to the system control computer 7 (not shown in FIG. 18). The game ball supplying card issuing and account settling machine 3 displays an anomaly message and takes pictures with the digital camera 52. The card issuing and account settling control computer 6 adds anomaly occurrence data to the anomaly data file 97 (T23, T24). Here, the anomaly level is set to level 2 (caution level).

In the system control computer 7 to which a notification is given that the card is wrong, although the process is not shown in FIG. 18, an anomaly notification process of the level 2 is performed, and whether or not it is necessary to search picture data is determined. For example, when the reason for the wrong card is that the ID is the same as an ID of a game ball supplying card 35 already inserted in some game ball supply command device 4 or in any other game ball supplying card issuing and account settling machine 3, all the picture data having the ID of the game ball supplying card 35 are automatically searched from the anomaly data file 97. At the same time, pictures are taken with the game ball supply command device 4 or with the other game ball supplying card issuing and account settling machine 3 into which a game ball supplying card 35 of the same ID is inserted.

In this way, supervising persons such as executives and managers of the game facility can sequentially check the searched picture data and currently taken picture data and recognize illegal persons and illegal acts. If necessary, picture data may be printed out.

When the inserted game ball supplying card 35 is right, the card issuing and account settling control computer 6 returns to the game ball supplying card issuing and account settling machine 3 signals to that effect and the possible supply balance up to that time point (it may be a possible additional money amount) (T241). The game ball supplying card issuing and account settling machine 3 displays a message of prompting the player to put in money or settle the account while showing the possible supply balance and/or possible additional money amount (T25).

In response to the above, the player inserts a bill or bills into the game ball supplying card issuing and account settling machine 3 and uses the selection button 39 to specify an amount up to which the possible supply balance is to be increased (T26, T27). Incidentally, the process of the case in which counterfeit bills are inserted is the same as the above.

The game ball supplying card issuing and account settling machine 3, in case an additional amount is specified that is greater than the amount of bill or bills inserted, or in case an additional amount is specified that is over the additional possible money amount, indicates an instruction to redo it (T28, T29).

The game ball supplying card issuing and account settling machine 3, in case a right amount is specified, transfers to the card issuing and account settling control computer 6 information such as the ID and updated balance (or additional amount) of the inserted game ball supplying card 35 (T30). The card issuing and account settling control computer 6 accordingly updates the contents (in particular the possible supply balance) in the game ball supply card file 94 (T31) and the like.

The game ball supplying card issuing and account settling machine 3 also causes the inserted game ball supplying card 35 to be discharged and if necessary causes change to be dispensed (T32) to be received by the player (T33).

The game ball supplying card issuing and account settling machine 3, when the game ball supplying card 35 is discharged, takes pictures with the digital camera 52, transfers the picture data to the card issuing and account settling control computer 6 which in turn adds the data to the anomaly data file 97 (T34, T35). Here, since the process is normal for increasing the possible supply balance, the anomaly level is set to level 0.

(A-2-4) Operation in Game Ball Supply

Next, operation when game balls are supplied (rented) will be described in reference to sequence diagrams shown in FIGS. 19 and 20.

When the player wants to start to play with the pachinko game machine 5, he or she inserts a game ball supplying card 35 into the game ball supply command device 4 (T40). The game ball supply command device 4 reads the ID of the inserted game ball supplying card 35 and sends it to the card issuing and account settling control computer 6 and causes it to check if the game ball supplying card 35 is authentic (T41, T42).

Also here, a game ball supplying card 35 is determined to be wrong when for example its registration record does not exist any more, its date of issue is not that day but someday in the past, or its ID is the same as an ID of a game ball supplying card 35 already inserted in some other game ball supply command device 4 or in some game ball supplying card issuing and account settling machine 3.

Figure 19:
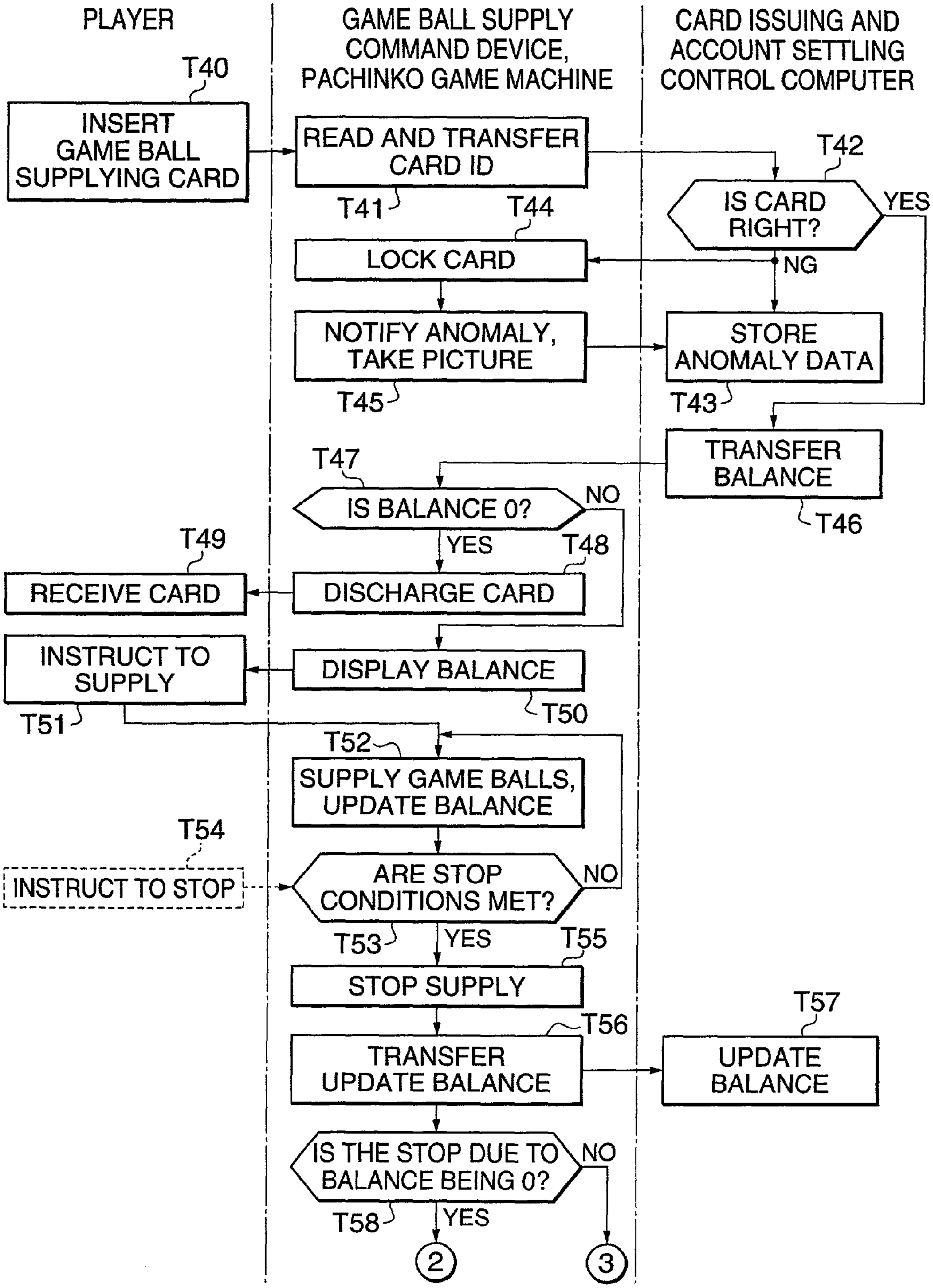
FIG. 19 is a sequence diagram (1) of operation when game balls are supplied in an embodiment of the invention.
Figure 20:
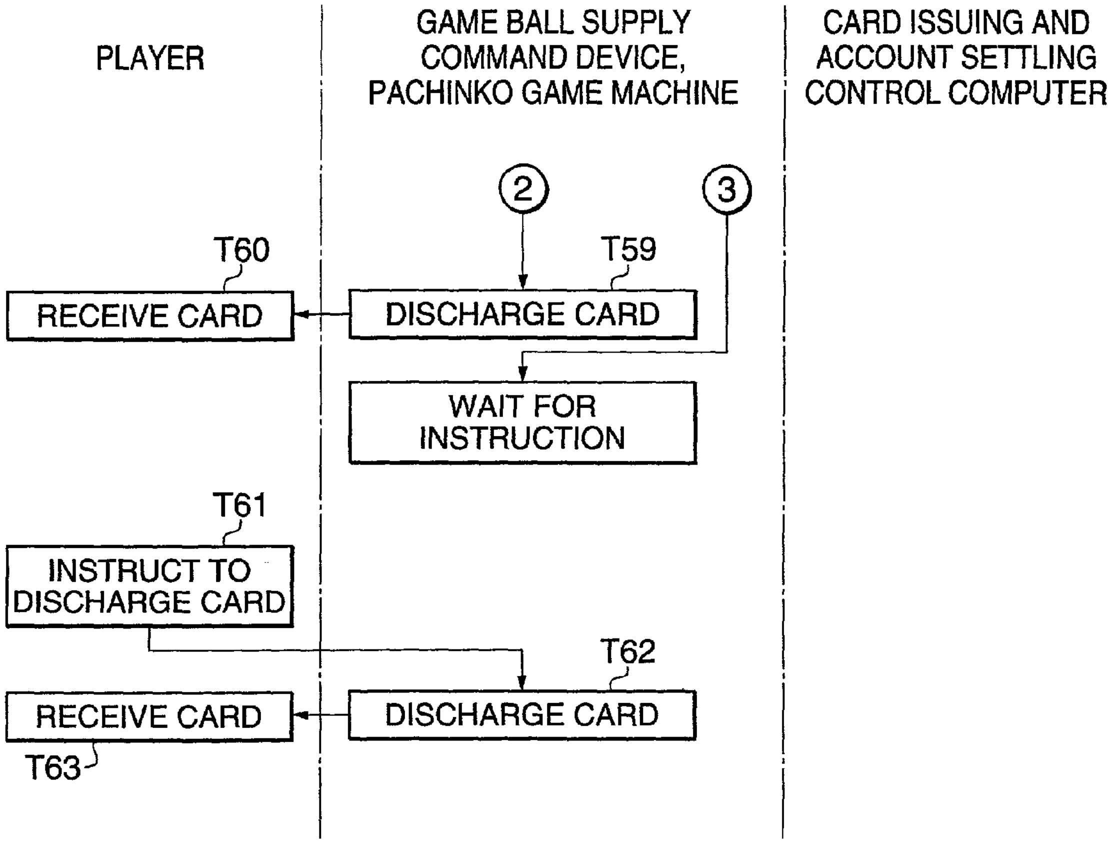
FIG. 20 is a sequence diagram (2) of operation when game balls are supplied in an embodiment of the invention.

In case the card is wrong, the card issuing and account settling control computer 6 sends information to that effect to the game ball supply command device 4 and the system control computer 7 (not shown in FIG. 19). The game ball supply command device 4 locks the inserted game ball supplying card 35 so that it cannot be transferred, displays a message of anomaly, and takes pictures with a digital camera 81. The card issuing and account settling control computer 6 adds anomaly occurrence data to the anomaly data file 97 (T43 to T45). Here, the anomaly level is set for example to level 2 (caution level).

In this case too, in the system control computer 7 to which a notification is given that the card is wrong, although the process is not shown in FIG. 19, an anomaly notification process of the level 2 is performed, and whether or not it is necessary to search picture data is determined. For example, when the reason for the wrong card is that the ID is the same as the ID of a game ball supplying card 35 already inserted in any other game ball supply command device 4 or in some game ball supplying card issuing and account settling machine 3 all the picture data having the ID of the game ball supplying card 35 are automatically searched from the anomaly data file 97. At the same time, pictures are taken at the game ball supply command device 4 or at the game ball supplying card issuing and account settling machine 3 into which a game ball supplying card 35 of the same ID is inserted.

In this way, supervising persons such as executives and managers of the game facility can sequentially check the searched picture data and currently taken picture data and recognize illegal persons and illegal acts. If necessary, picture data may be printed out.

When the inserted game ball supplying card 35 is right, the card issuing and account settling control computer 6 returns to the game ball supply command device 4 signals to that effect (T46) and the possible supply balance. The game ball supply command device 4 causes the inserted game supplying card 35 to be discharged if the possible supply balance is 0 (T47 to T49) or causes the pachinko game machine 5 to display the balance if the balance is not 0 (T50).

The game ball supply command device 4 may also be arranged to take the picture of the player when the game ball supplying card 35 is recognized to be right. Taking the picture before starting the game in this way makes it possible to find a player who perpetrates fraudulent practices while covering the picture taking opening 81*a*.

The player is to check the possible supply balance and operate a game ball renting button 79 (T51). At this time, the pachinko game machine 5 supplies (rents) game balls in number for a unit at a time, and deducts the possible supply balance by the number supplied for a unit every time the supply is finished, and continues the game ball supply until a return button 80 is pressed or the number of game balls for the units set to the game ball supply command device 4 is rented out or game ball renting finish signal becomes 0 (T52 to T55).

When the supply of game balls stops, the game ball supply command device 4 sends together with the ID of the inserted game ball supplying card 35 the updated possible supply balance to the card issuing and account settling control computer 6, which in turn updates the balance in the game ball supply card file 94 (T56, T57).

Also, when the possible supply balance becomes 0, the inserted game ball supplying card 35 is discharged to be received by the player (T58 to T60).

In case the player wants to stop playing with the pachinko game machine 5 with which the player has been playing, the player presses the return button 80 (T61). At this time, the game ball supplying card 35 is discharged from the game ball supply command device 4, and the player receives the card (T62, T63).

Whatever may be the cause, when the game ball supplying card 35 is discharged from the game ball supply command device 4, although not shown, information on the discharge is sent to the card issuing and account settling control computer 6, which in turn empties the card insertion device field in the game ball supply card file 94.

(A-2-5) Operation for Settlement

Figure 21:
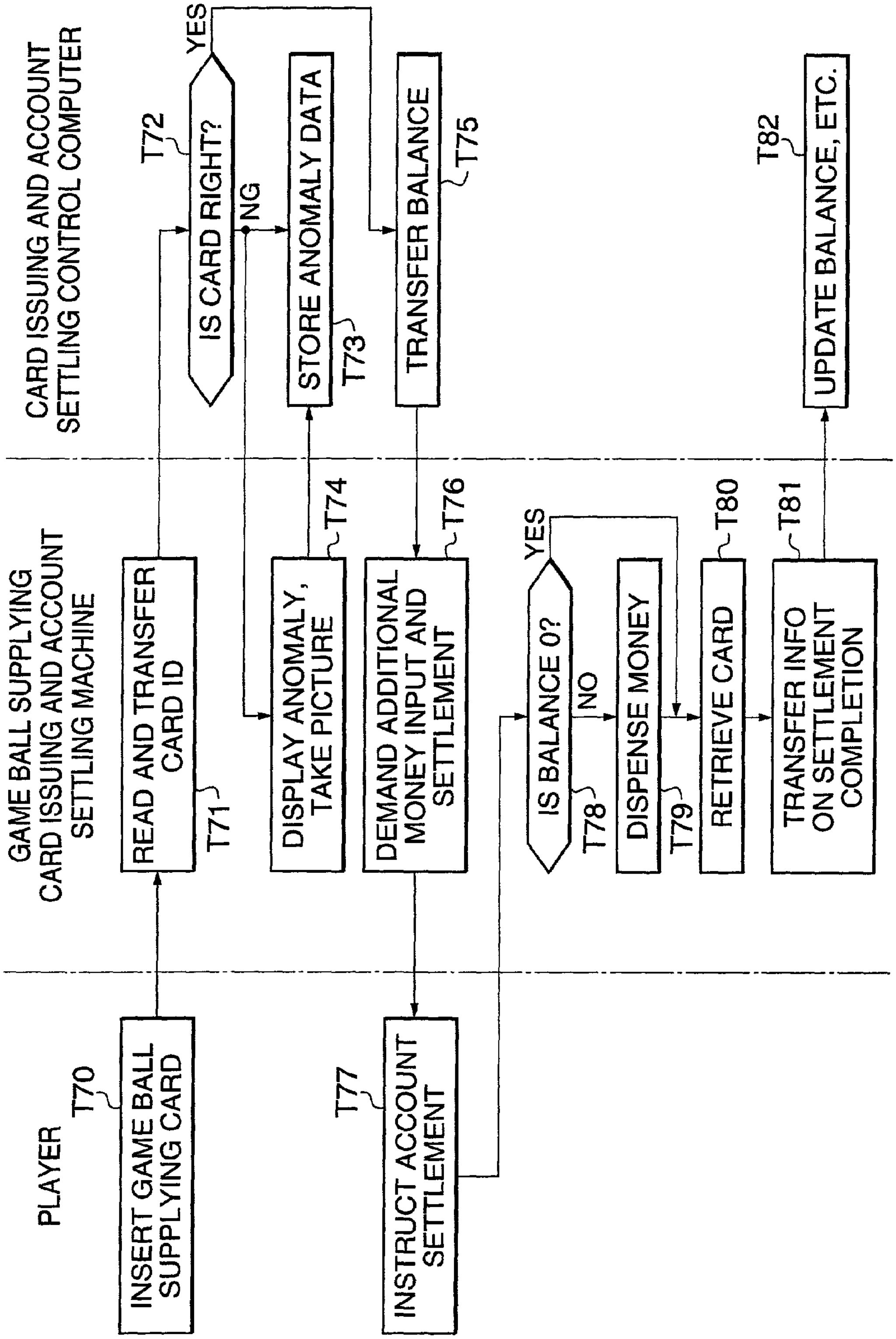
FIG. 21 is a sequence diagram of operation when settling an account in an embodiment of the invention.

Next, the operation for settling the possible supply balance related to the game ball supplying card 35 will be described in reference to the sequence diagram shown in FIG. 21.

Incidentally, part of the settling operation up to the middle of the process is similar to that of increasing the possible supply balance. Therefore, explanation of the similar part will be made simply.

To settle the possible supply balance related to the game ball supplying card 35, the player inserts the game ball supplying card 35 into the game ball supplying card issuing and account settling machine 3 (T70). The game ball supplying card issuing and account settling machine 3 obtains the ID of the inserted game ball supplying card 35 through the card information reading section 56 and transfers the ID to the card issuing and account settling control computer 6 (T71), which in turn checks the card for its authenticity by referring to the contents in the game ball supply card file 94 (T72).

In case the card is wrong, the card issuing and account settling control computer 6 sends the information on being a wrong card to the game ball supplying card issuing and account settling machine 3 and to the system control computer 7. The game ball supplying card issuing and account settling machine 3 displays information on the anomaly, and takes pictures with the digital camera 52. The card issuing and account settling control computer 6 adds anomaly occurrence data (level 2) to the anomaly data file 97 (T73, T74). In the system control computer 7 to which the information on the anomaly is notified, anomaly notification process of the level 2 is performed and whether or not searching picture data is necessary is determined.

When the inserted game ball supplying card 35 is right, the card issuing and account settling control computer 6 sends information to that effect and the possible supply balance up to that time point back to the game ball supplying card issuing and account settling machine 3 (T75) and the game ball supplying card issuing and account settling machine 3 displays a message of prompting the player to put in money or settle the account while clearly showing a possible supply balance (T76).

If the possible supply balance is not 0, the player presses the settlement button 40 (the possible supply balance may or may not be 0; T77). At this time, the game ball supplying card issuing and account settling machine 3, after confirming that the possible supply balance is not 0 (T78), dispenses bills and coins for the balance money amount, and retrieves the inserted game ball supplying card 35 (T79, T80). It also sends information on the completion of the settlement together with the card ID to the card issuing and account settling control computer 6, which in turn sets the balance field of the game ball supply card file 94 to 0 and empties the card insertion device field (T81, T82).

Here, it may also be arranged to erase the picture data related to the card ID in question in the anomaly data file 97 when the settlement is completed. However, it may also be arranged for the later utilization for security that the picture data are automatically erased after a specified period of time from the completion of the settlement (for example two to three days), or that the data are erased only when the managers or the executives of the game facility manually enter an instruction to erase into the system control computer 7.

(A-2-6) Operation When the Light Amount Sensor Works.

Figure 22:
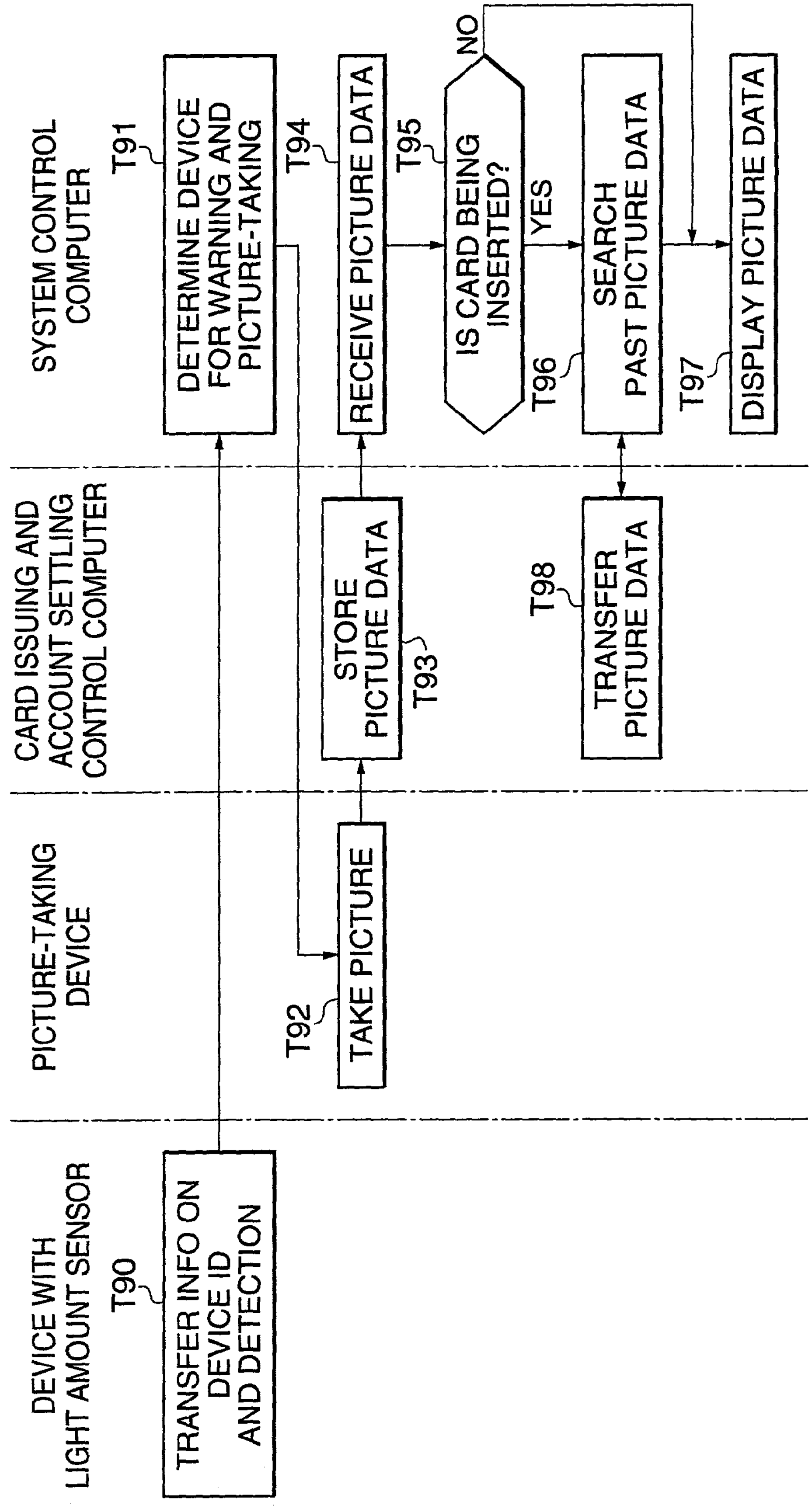
FIG. 22 is a sequence diagram of operation when the light amount sensor works in an embodiment of the invention.

Next, in reference to the sequence diagram shown in FIG. 22, the operation of a device provided with a light amount sensor will be described when the light amount sensor detects shortage in the light amount for taking pictures.

Players can recognize that their pictures are taken with various devices. Bad players may cover the picture taking window portions (16*a*, 52*a*, 81*a*) to obstruct taking pictures. To detect such a practice, light amount sensors 26, 65, 86, and 121 are provided.

When the light amount sensors 26, 65, 86, and 121 detect shortage in the light amount, the devices 2, 3, 4, and 8 provided with the light amount sensors issue warning and transfer, to the system control computer 7, the IDs of the respective devices, if any inserted card is present, together with its ID (T90).

Here, the system control computer 7 issues warning of the level 2 (the reason for the level 2 is that a hand or the like may be inadvertently placed over the window portion), determines the devices 2, 3, and 4 provided with digital cameras and video cameras 9 in positions where the player can be taken pictures (either from behind or from the side) on the basis of the IDs of the devices, causes the determined devices to take pictures, and notifies the card issuing and account settling control computer 6 of the data of the anomaly occurrence (T91, T92).

The obtained picture data and video signals are transferred to the card issuing and account settling control computer 6 and to the system control computer 7. In the card issuing and account settling control computer 6, the information is additionally stored in the anomaly data file 97. The system control computer 7 receives the transferred data (T93, T94).

The system control computer 7 checks the device in which the light amount sensor has worked if any inserted card is present (T95), if present, gives the card ID to the card issuing and account settling control computer 6, causes the field of the card ID in the picture data obtained this time to store the ID, and causes a search for the picture data taken in the past in relation to the card ID (T96, T98).

In case no card is inserted in the device in which the light amount sensor worked or in case past picture data are obtained by the search, the system control computer 7 calls attention of a watchman by giving forth warning sound and performs the process of displaying picture data obtained currently or picture data and video signals obtained in the past (T97).

(A-2-7) Operation When Cheat Sensor Works

Figure 23:
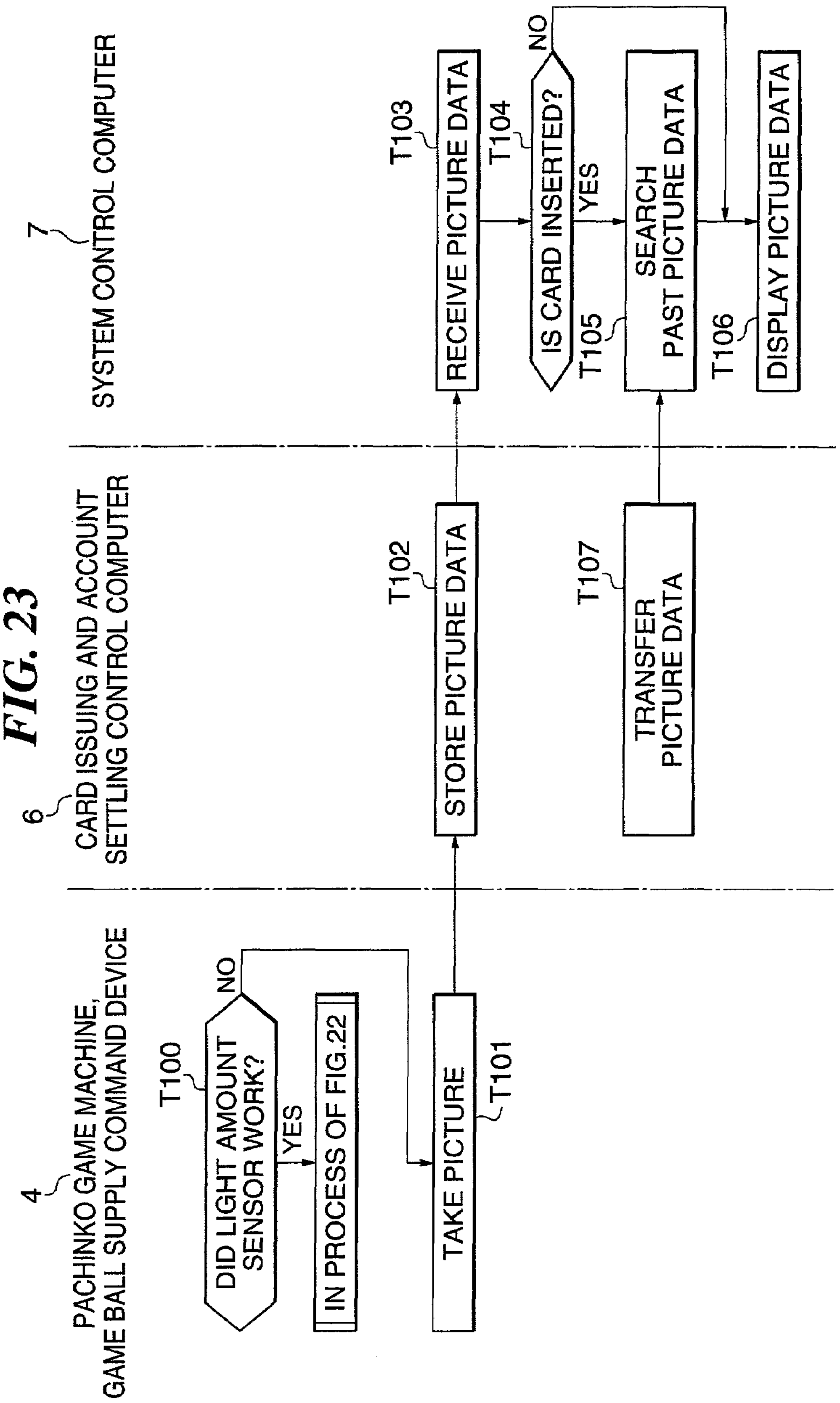
FIG. 23 is a sequence diagram of operation when the cheat sensor works in an embodiment of the invention.

The operation when a cheat sensor of the pachinko game machine 5 detects a cheat will be described in reference to the sequence diagram shown in FIG. 23.

The game ball supply command device 4, to which a detection signal is given from the cheat sensor of the pachinko game machine 5, first checks if the light amount sensor 86 has detected shortage in the light amount (T100). In case the light amount shortage has been detected, since the above process at the time of detection with the light amount sensor 86 is being performed, the process is left as it goes even if the cheat sensor works.

On the other hand, in case the light amount sensor 86 has not worked for detection, the game ball supply command device 4 takes pictures using the digital camera 81 and transfers obtained picture data to the card issuing and account settling control computer 6 and to the system control computer 7. The card issuing and account settling control computer 6 additionally stores the anomaly occurrence data of the level 2 into the anomaly data file 97. The system control computer 7 stores the data into the reception buffer or the like in the communication processing section 104 while giving forth a warning of the level 2 (T101 to T103).

The system control computer 7 checks if the game ball supplying card 35 is present as inserted in the game ball supply command device 4 (T104) and, if present, performs a search for the picture data taken in the past in relation to the card ID (T105, T107).

In case no game ball supplying card 35 is inserted in the game ball supply command device 4 or in case past picture data are obtained by the search, the system control computer 7 again calls attention of a watchman by giving forth warning sound and performs the process of displaying picture data obtained currently or picture data obtained in the past (T106).

(A-2-8) Operation When an Employee Leaves Workplace

Next, the operation when an employee leaves the workplace will be described in reference to the sequence diagram shown in FIG. 24.

The control section 111 of the employee's card device 8 in its standby state causes the display section 118 to display a message of demanding entry of the employee's fixed code. The employee who is about to leave the workplace enters his or her own fixed code through the entry section 116 (T140).

Here, the control section 111 transfers the employee's fixed code through the communication processing section 119 to the card issuing and account settling control computer 6 to have it check if the employee's fixed code is right (T141, T142).

Figure 24:
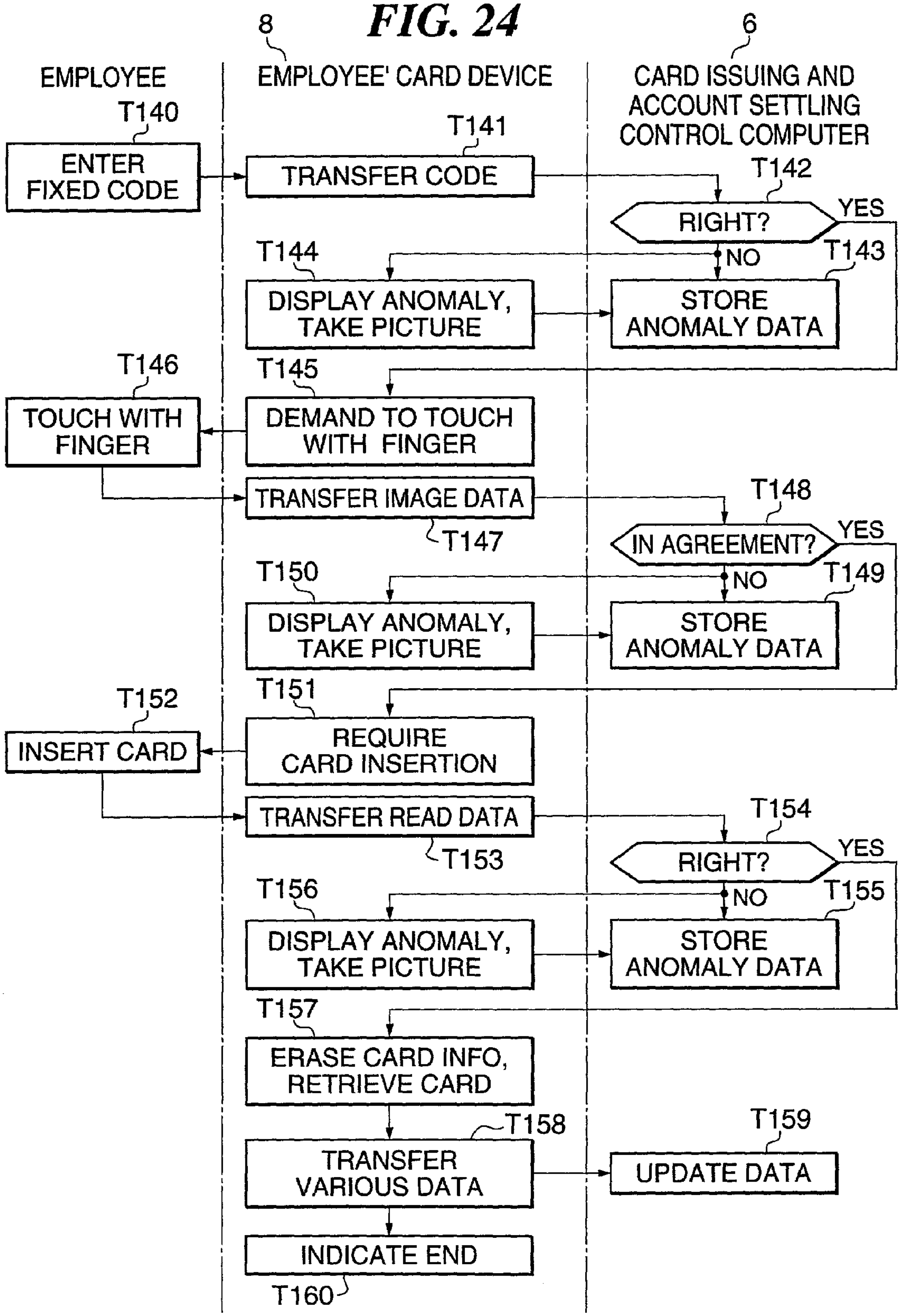
FIG. 24 is a sequence diagram of operation when an employee leaves the workplace in an embodiment of the invention.

In case the employee's fixed code entered is wrong, the card issuing and account settling control computer 6 sends information to that effect to the employee's card device 8 and to the system control computer 7 (omitted in FIG. 24). The employee's card device 8 displays information to that effect, causes the digital camera 120 to take pictures, and sets the display back to the original state. The card issuing and account settling control computer 6 adds anomaly occurrence data including the picture data to the anomaly data file 97 (T143, T144). Here, the anomaly level is level 2 (caution level).

In the system control computer 7 to which a notification is given to the effect that the employee's code is wrong, although not shown in FIG. 24, anomaly notification process of the level 2 is performed and at the same time whether or not a search for the picture data is necessary is determined.

On the other hand, when the employee's fixed code entered is right, information to that effect is given from the card issuing and account settling control computer 6 to the employee's card device 8, and the control section 111 causes the display section 118 to display a message prompting the player to touch the individual's information reading section (here, it is assumed to be a fingerprint reading device) 115 with a finger (T145). Accordingly, the employee has his or her finger image read with the individual's information reading section 115. The control section 111 transfers the fingerprint image data through the communication processing section 119 to the card issuing and account settling control computer 6 to check if the image corresponds to the employee's fixed code (T146 to T148).

In case the fingerprint image data do not agree with those registered, the card issuing and account settling control computer 6 sends information to that effect to the employee's card device 8 and to the system control computer 7 (not shown in FIG. 24). The employee's card device 8 displays a message of the anomaly and causes the digital camera 120 to take pictures. The card issuing and account settling control computer 6 adds to the anomaly data file 97 anomaly occurrence data of the level 2 (caution level) including the picture data (T149, T150).

In the system control computer 7 to which a notification is given to the effect that the fingerprint image data do not agree with the registered data, although not shown in FIG. 24, anomaly notification process of the level 2 is performed and at the same time whether or not a search for the picture data is necessary is determined.

On the other hand, if the fingerprint image data prove to be right, a notification to that effect is given from the card issuing and account settling control computer 6 to the employee's card device 8. The control section 111 causes the display section 118 to display a message demanding insertion of the employee's card 71 into the card slot 112 (T151). As the code has been checked and the person is confirmed to be the employee at work, the employee is demanded to insert the employee's card 71. In response, the employee inserts the employee's card 71 into the card slot 112 (T152). The information recorded on the employee's card 71 is read with the employee's card access section 113 and given to the control section 111.

At this time, the control section 111 transfers the information obtained by the reading to the card issuing and account settling control computer 6 through the communication processing section 119 to have the inserted employee's card 71 checked for authenticity (T153, T154). For example, the inserted employee's card 71 is determined to be wrong if the employee's fixed code affixed with a random number (the day's employee's code) or the operation history is different from that registered in the card issuing and account settling control computer 6.

In case the inserted employee's card 71 proves to be wrong, the card issuing and account settling control computer 6 sends information to that effect to the employee's card device 8 and to the system control computer 7 (not shown in FIG. 24). The employee's card device 8 displays a message of the anomaly and causes the digital camera 120 to take pictures. The card issuing and account settling control computer 6 adds anomaly occurrence data of the level 2 (caution level) including the picture data to the anomaly data file 97 (T155, T156).

In the system control computer 7 to which a notification is given to the effect that the inserted employee's card 71 is wrong, although not shown in FIG. 24, anomaly notification process of the level 2 is performed and at the same time it is determined whether or not a search for the picture data is necessary.

On the other hand, when the employee's card 71 proves to be right, information to that effect is given from the card issuing and account settling control computer 6 to the employee's card device 8, and the control section 111 causes the card access section 113 to erase the other information than the card ID of the inserted employee's card 71 and to retrieve it into the employee's card holding section 110 (T157).

The control section 111 picks up the (workplace leaving) time data at that time from a built-in timer, and transfers to the card issuing and account settling control computer 6 the card ID of the retrieved employee's card 71, the day's employee's code consisting of the employee's fixed code and a generated random number, and the workplace leaving time, updates and adds various data in the employee's card file 96 and in the anomaly data file 97 (T158, T159). After that, the control section changes the display to that showing the completion of the process (T160). The card issuing and account settling control computer 6 calculates for example the employee's work hours of the day, etc. The anomaly data added here is of level 0 (normal).

(A-2-9) Process of Searching Anomaly Data Produced

Figure 25:
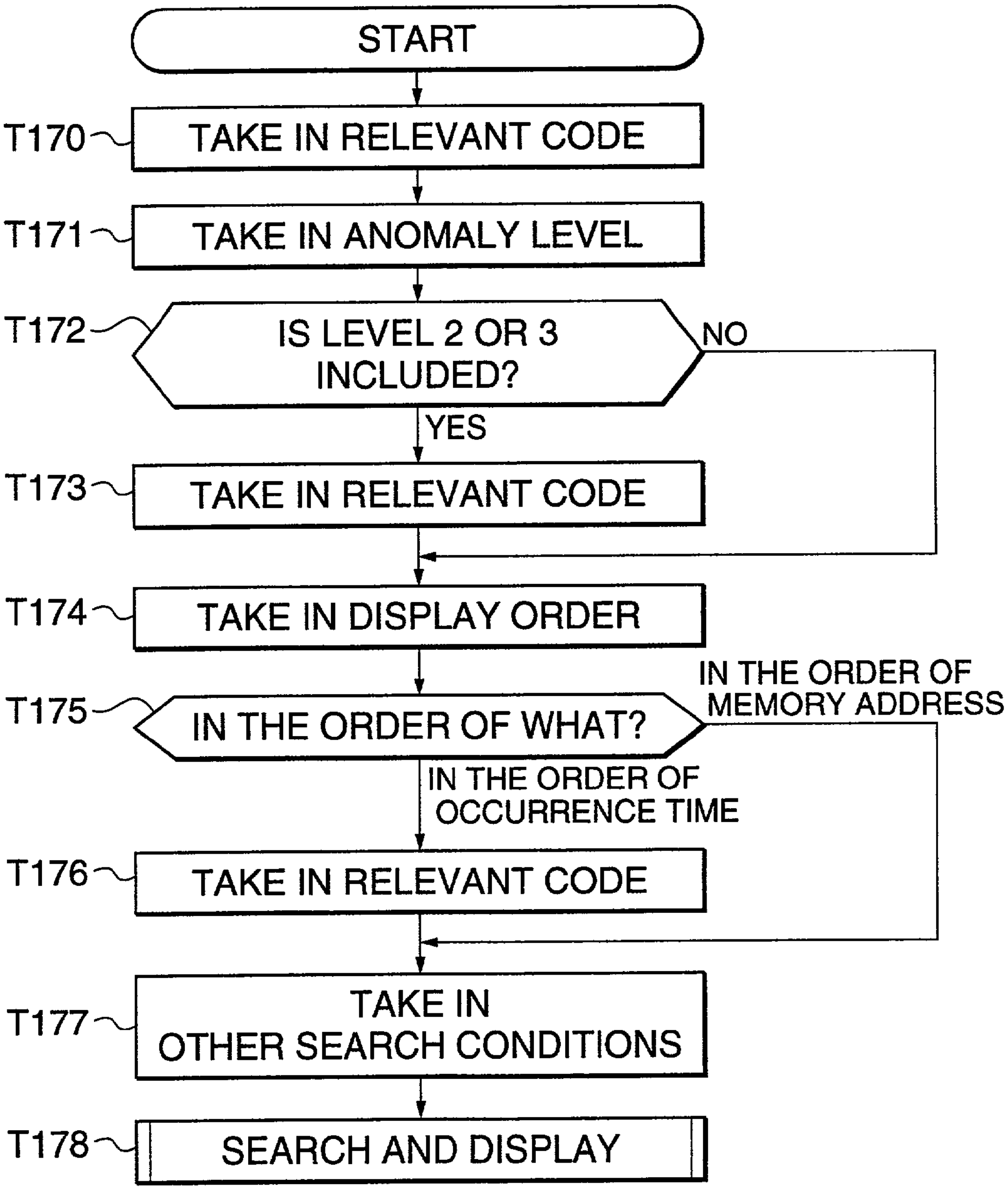
FIG. 25 is a flowchart of the process of searching anomaly data occurring in an embodiment of the invention.

Next will be described, in reference to the flowchart shown in FIG. 25, the process in which the supervisors of the game facility such as executives and managers operate the system control computer 7 to search and display the produced anomaly data stored in the anomaly data file 97 of the card issuing and account settling control computer 6. FIG. 25 shows the process performed with the system control computer 7.

Incidentally, as described above, the system control computer 7, when certain conditions are met, may occasionally automatically search the produced anomaly data stored in the anomaly data file 97.

When a managing person wants to search and display the produced anomaly data (record) recorded in the anomaly data file 97 of the card issuing and account settling control computer 6, gains access to the system control computer 7 to start up the process routine shown in FIG. 25.

Here, the system control computer 7 (strictly speaking, its control section 111) requires an entry of a relevant code for certifying that the managing person in question is permissible to gain access to the anomaly data file 97, and picks up the code entered by the managing person (T170). Although the steps are not shown in FIG. 25, it is arranged that the process does not go further when a wrong code is entered. As described above, this embodiment is arranged to restrict the persons who are permitted to gain access to the anomaly data file 97, so that an unauthorized person cannot erase or rewrite the anomaly data fraudulently.

When the managing person is confirmed to be permissible to gain access to the anomaly data file 97, an entry of an anomaly level of the produced anomaly data related to the search and display is requested. The anomaly level entered by the managing person is picked up and a determination is made whether the levels 2 and 3 are also specified as subjects (T171, T172). The managing person may specify either all the anomaly levels of 0 to 3 or only a single level such as 0 or 3.

When the specified anomaly levels include at least the level 2 or level 3, an entry of a relevant code (preferably different from the above-mentioned relevant code) for certifying that the managing person is permissible to gain access to the anomaly data is required, and the code entered is picked up (T173). Here also, it is arranged that the process does not go further when a wrong code is entered. As described above, this embodiment is arranged that the access to the anomaly data of the levels 2 and 3 is gained through prudently arranged steps, and that unauthorized persons cannot erase or falsify the anomaly data of the levels 2 or 3.

In case a right code is entered or only the level 1 or below is specified as the anomaly level related to the search and display, the order of display of plural produced anomaly data is requested, the order of display entered by the managing person is taken in, and the content is determined (T174, T175).

As described above, a large number of produced anomaly data (record) are recorded in the state of being shuffled or interleaved independent of production time in the anomaly data file 97 of the card issuing and account settling control computer 6. Dummy data or past data that have undergone reading out process are also inserted and recorded. Therefore, it is preferable to provide a method of displaying in the order of storage addresses and a method of displaying in the order of production time, so that, when a display in the order of production time is demanded, the entry of a relevant code (preferably different from the above-mentioned two types of relevant codes) is required and the code entered by the managing person is taken in (T176). Also here, it is arranged that the process does not go further when a wrong code is entered. This embodiment is arranged that the display in the order of production time is also permitted through prudently arranged steps and that it is difficult for unauthorized persons to find data they want to erase or falsify.

In case a right code is entered or the method of displaying in the order of storage addresses is specified, the system control computer 7 takes in another search display condition and takes out one or plural relevant anomaly data from the anomaly data file 97 of the card issuing and account settling control computer 6 and displays them (T177, T178).

The anomaly data displayed in this way and to which relevant measures are taken may be erased from the anomaly data file 97. However, as described above, they are left recorded for a certain period of time as the past data already read, so that a third party has difficulty in finding the other anomaly data.

(A-2-10) Relation Between the Type of Anomaly and the System Process

Some of the types of anomaly (including normalcy) for which data are registered in the anomaly data file 97 of the card issuing and account settling control computer 6 are described above in relation to the operation. However, there are many other types. Although all of them cannot be described here, some other types of anomaly for which data are registered in the anomaly data file 97 will be described in reference to FIG. 26, with some redundancy with the above description. Also, corresponding operation on the system side will be described.

Figure 26A:
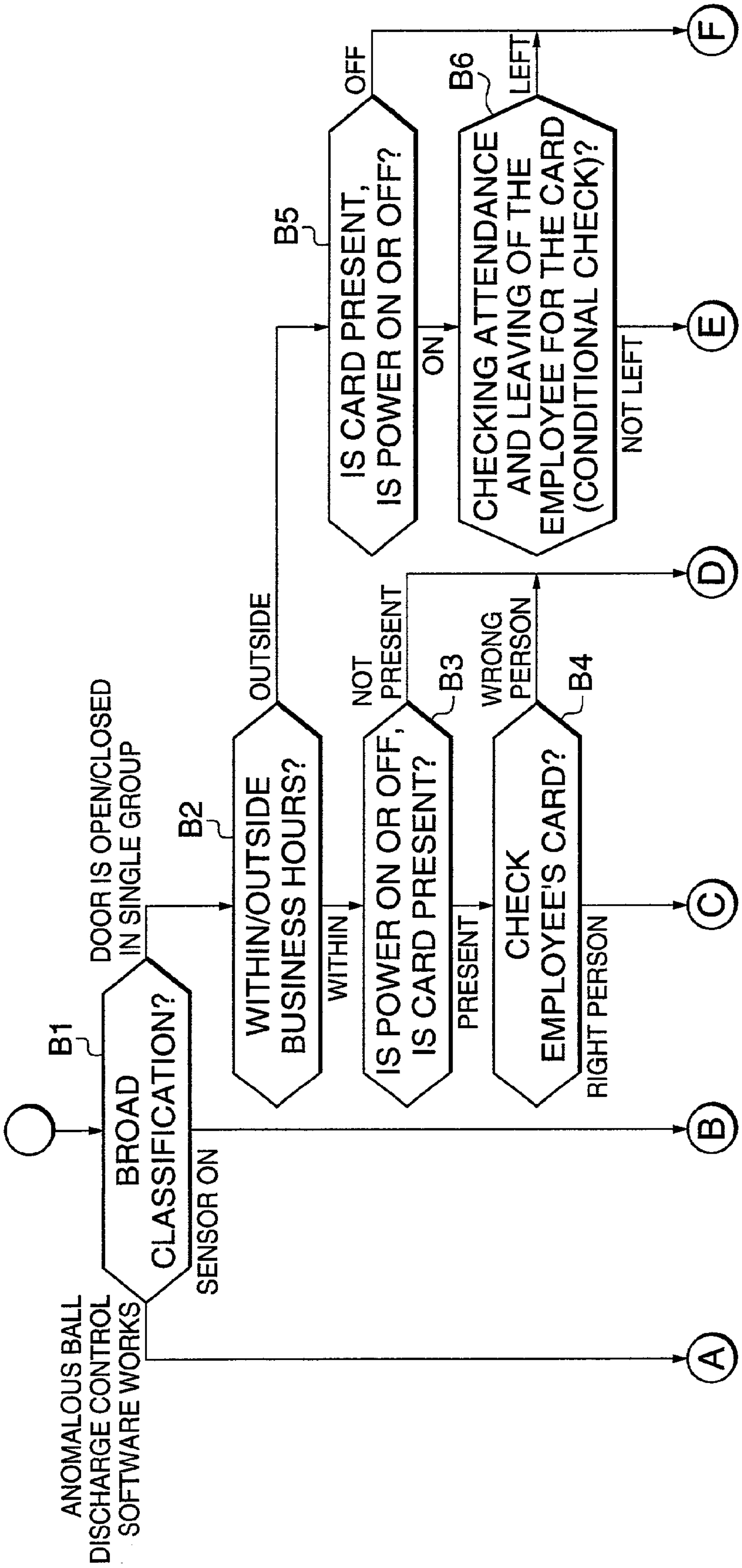
FIG. 26 is an explanatory drawing showing the relation between the types of anomaly and the system in an embodiment of the invention.

Although part of FIG. 26 looks like a flowchart, it does not show the process flow but classification of the anomaly types. It can be seen as a flowchart from the side of the card issuing and account settling control computer 6.

In FIG. 26, "certificate picture" means a picture (data) taken with a digital camera, and "video" means a video camera 9. As for the sound produced when anomalies occur, the sound of the level 2 is termed as "caution sound" and that of the level 3 as "warning sound." The difference in sound enables the managing persons or the like of the game facility to recognize the anomaly level and decide if a quick measure is required.

Wrongdoers include players, employees, and nighttime intruders.

The wrongdoing perpetrated by the players in connection with the game is obtaining game balls through fraudulent practices. The fraudulence can be recognized by detecting anomalous discharge of game balls with the system control computer 7 (control software) or a cheat sensor.

(a) In case the game ball discharge is anomalous (See B1), the system side produces warning sound, the system control computer 7 issues warning, takes picture data and video signals, and records data (of the level 2) of the player's card ID.

When such an anomaly occurs, the staff members watch video screens, or go to the pachinko game machine 5 to watch the site. Since the ball discharge anomaly occurs without the cheat sensor working, they check the pachinko game machine 5 for the presence of a fake ROM after the business hours.

(b) In case a cheat sensor works (See B1), the action on the system side is similar to that for the ball discharge anomaly. When such an anomaly occurs, the staff members watch video screens, or go to the pachinko game machine 5 to watch the site. Since the cheat sensor works, the internal check need not wait for the end of the business hours.

Most of the wrongdoings perpetrated by players, employees, or nighttime intruders are accompanied by opening or closing doors of the devices such as the pachinko game machine 5 and the game ball supplying card issuing and account settling machine 3. In case any door is opened or closed, even if the event is normal, it is arranged to record data of the event.

(c) In case that any door is opened or closed during the business hours under conditions of the main power supply remaining on and that the operator is confirmed to be permissible to operate the device in question on the basis of the employee's card 71 or the like (See B1 to B4), the system side simply records specified data (of the level 0) in normal operation. Incidentally, also in that case, it may be arranged to take pictures with the video camera 9. Staff members need not take any special actions here.

(d) In case any door is opened or closed during the business hours under conditions of the main power supply turned off (opening or closing a door with the main power supply turned off indicates high probability of wrongdoing), or the operator cannot be confirmed to be permissible to operate the device in question on the basis of the employee's card 71 or the like although the main power supply is not turned off (See B1 to B4; Since the confirmation is impossible in spite of the door being opened or closed, it is highly probable that the act is a wrongdoing), the system side produces warning sound, the system control computer 7 issues warning, obtains picture data and video signals, and records data of the card ID or the like (level 3). The staff members take immediate actions against this anomaly.

(e) In case that any door is opened or closed outside the business hours under conditions of the main power supply remaining on and that the operator is confirmed to be permissible to operate the device in question on the basis of the employee's card 71 or the like (See B1, B2, B5, and B6), the system side records specified data in normal operation (level 1). Incidentally, also in this case, it may be arranged to take pictures with the video camera 9. The confirmation here in relation to the employee's card 71 includes confirming that the employee has not yet left the workplace.

Although the above case is determined to be normal, since it occurs outside the business hours, a shop manager or the like checks, if necessary, the device at an appropriate time such as before opening the shop.

(f) In case any door is opened or closed outside the business hours under conditions of the main power supply turned off (opening or closing a door with the main power supply turned off indicates high probability of wrongdoing), or the operator cannot be confirmed to be permissible to operate the device in question on the basis of the employee's card 71 or the like although the main power supply is not turned off (See B1, B2, B5, and B6; Since the confirmation is impossible in spite of the door being opened or closed, it is highly probable that the act is a wrongdoing), the system side produces warning sound, the system control computer 7 issues warning, takes picture data and video signals using if possible the auxiliary power supply, records various data (of the level 3), and notifies the security company (which may be through wireless means). Also here, the confirmation in relation to the employee's card 71 includes confirming that the employee has left the workplace.

Even under the condition of the main power supply turned off, the function of the above-described auxiliary power supply enables the above monitoring operation to be performed on the system side.

In relation to the above anomaly, the staff members, if they are in the game facility, immediately take actions and if not in the game facility, check first thing in the next morning the devices according to the display (which may be shown when the main power supply is turned on) with the system control computer 7.

(A-3) Effects of the Embodiment

The above embodiment is arranged to classify the anomaly such as fraudulent and illegal acts perpetrated by employees and players by the level of anomaly, and the method of visual and/or acoustic notification and coping operations are changed according to the levels. Therefore, a limited number of employees can cope with various anomalies efficiently.

The above embodiment is also arranged to record the anomaly data together with the level information. Therefore, it is possible to search and find recorded data of fraudulent acts quickly by specifying level information. It is also arranged to record the anomaly data in the state of being shuffled or interleaved, so that it is difficult for the wrongdoers to find and erase the data related to the wrongdoings they have perpetrated.

Fraudulent acts may be perpetrated not only during the business hours but also outside the business hours. However, since the components related to the monitoring function are arranged to receive power supplied from the auxiliary power supply even when the main power supply is off, the monitoring function works effectively even when the main power supply is off such as during outside the business hours.

(B) Other Embodiments

While various modified embodiments are described above, the other modified embodiments may be enumerated as follows.

The devices on which the digital camera is mounted are not limited to those described above. For example, the digital camera may be mounted on money changing machines, prepaid card issuing machines, or automatic vending machines placed in the game facility hall. The pachinko game machines themselves may be provided with a digital camera. The digital camera may also be mounted on various devices placed in the control room of the game facility. It may be arranged that data obtained from those devices are recorded in the anomaly data file 97.

While the above embodiments are described assuming that the employee's operation history is recorded in a file separate from the anomaly data file 97, the employee's operation history may be recorded as a type of anomaly data in the anomaly data file 97. The concept of levels applied to the anomaly data may also be applied to the employee's operation history when the employee's operation history is recorded separately from the anomaly data. Incidentally, the term "anomaly data" in the present claims includes data of the operation history.

Shuffling and interleaving of data may also be applied to the operation history recorded on the employee's card 71. Also, dummy data and data of the past that have already been read may also be inserted.

The above embodiments are arranged that the employee's operation history and anomaly data are transferred immediately to and recorded in the card issuing and account settling control computer 6. However, it may also be arranged that such data are recorded in the operated devices (including the other devices such as the pachinko game machines as well as the game ball supply card issuing and account settling machine) and the anomaly-produced devices. Also at such recording, shuffling and interleaving may be applied, or dummy data and data of the past that have already been read may be inserted.

As the recording medium in the above devices, the semiconductor memory is most likely to be used (the semiconductor memory may also be used in the card issuing and account settling control computer 6). It may be arranged that shuffled or interleaved data are distributed and recorded in plural semiconductor memories. In that way, even fraudulent replacement of the semiconductor memory can be recognized with the system.

According to the above description, either dummy data or past data that have already been read are mixed. However, both of them may be mixed. For example, in case the amount of past data within a storage period is small, certain number of dummy data may be added to the former. Incidentally, the greater the amount of dummy data and already read past data, the harder for the wrongdoers, along with the function of shuffling and interleaving, to find intended data.

It may also be arranged that total erasure of the anomaly data or the operation history data is prohibited and that warning is given to a person who inadvertently gives an instruction. Likewise, it may be arranged that warning is given against the removal of a semiconductor memory, on which anomaly data or operation history data are recorded, from the device. In that case, a detection means such as a removal sensor is necessary.

In the above description of embodiments, the anomaly sensor is not described in detail for its constitution. However, the sensors as enumerated below are preferable. In particular, they are preferably of such constitution that detects anomaly occurring when no managing persons or employees of the game facility are present such as at night or when the game facility is closed, by utilizing power from the auxiliary power supply.

That is to say, a preferable constitution in terms of power consumption is that which holds a contact point open when no anomaly is present, to close the contact point when anomaly occurs to cause an electric current to flow, and the flow of current is used as a detection signal. Preferable anomaly sensors are for example, one that closes the contact point when the door is opened, and a vibration sensor that closes the contact point as vibration causes a weight to move. In case the game facility is closed over several days, the above is preferable because the monitoring time with the auxiliary power source is long.

In case the above type of anomaly sensor is used, it may be arranged that an electronic switch made of a transistor or the like is provided parallel to the contact point of the anomaly sensor to monitor breakage of wire (breakage caused by a wrongdoer or the like) of an anomaly sensor in positions other than the contact point by periodically (for example at 5 minute intervals) closing the electronic switch with the control section.

The card issuing and account settling control computer 6 and the system control computer 7 may be constituted with a single computer.

Furthermore, while the game machine described above is the pachinko game machine, it may be any other game machine such as a slot machine.

As described above, the game facility monitoring system of the present invention comprises plural number of game machines or game-related devices provided with detecting means that detects the state of a device or the operation of a device resulting from wrong or illegal acts, detects the state of a device or the operation of a device possibly resulting from wrong or illegal acts, and gives out notification, and anomaly warning means that performs warning operation determined by an anomaly level corresponding to the detected contents out of plural anomaly levels when any of the detecting means works. Therefore, the above system is provided with a greatly improved monitoring function against wrong or illegal acts.

As described hereinbefore, to solve the problems, a game facility monitoring system according to the embodiment comprises, (1) plural game machines or game-related devices (pachinko game machines 5 or machines 3 which issue cards for dispensing game balls and settle account) having detecting means for detecting and giving out notification of a device state or a device action caused by a wrong or illegal act or possibly related to the wrong or illegal act, and (2) anomaly notifying means (such as a computer 6 for issuing cards and settling accounts or a system control computer 7) that, when anyone of the detecting means performs a detecting action, performs a notifying action determined with one of plural anomaly levels corresponding to the contents of the detection.

Here, it is preferable for the system to further comprise anomaly data recording means for recording anomaly data that include also information on the anomaly level corresponding to the detected contents when any of the detecting means has performed a detecting action.

It is also preferable that the anomaly data recording means is such that records anomaly data together with dummy data having nothing to do with monitoring function or the anomaly data of the past that have already been read and processed, with such data mixed in the anomaly data.

It is also preferable that the system has anomaly data searching means capable of taking out a piece of anomaly data of a specified anomaly level out of plural pieces of anomaly data recorded in the anomaly data recording means.

It is also preferable for the system to comprise operator limiting means for permitting only specified persons to have access to the anomaly data recording means.

It is also preferable that the plural game machines or game-related devices with the detecting means have an auxiliary power supply for permitting continued action of the detecting means when a main power supply is off.

What is claimed is:

1. A game facility monitoring system comprising:

a plurality of game machines and game-related devices, at least one of the game machines and game-related devices including means for providing a transaction with a person, upon input by the person of identification information identifying the person, means for detecting disagreement between identifying information input and previously recorded identifying information, means for assigning one of a plurality of anomaly levels based on degree of disagreement between the identification information input and the previously recorded identification information, wherein each of the anomaly levels indicates a different, respective probability of a fraudulent transaction, a first of the anomaly levels represents a non-fraudulent transaction, a second of the anomaly levels represents a potentially fraudulent transaction, and third of the anomaly levels represents a fraudulent transaction, and a camera capturing an image of a person attempting a transaction only when the transaction attempted has an anomaly level exceeding a threshold anomaly level; and a computer connected to the at least one of the game machines and the game-related devices for recording transactions and, when the threshold anomaly level has been exceeded, a captured image of the person, wherein the computer includes a processor programmed so that, in response to assigning the first of the anomaly levels to a disagreement, to permit completion of the associated non-fraudulent transaction, in response to assigning the second of the anomaly levels to a disagreement, to trigger the camera to capture an image of the person attempting the associated potentially fraudulent transaction and to record transaction information for later review, and in response to assigning the third of the anomaly levels to a disagreement, to trigger the camera to capture an image of the person attempting the associated fraudulent transaction, to record transaction information, and to trigger an alarm for immediate response.

2. The game facility monitoring system according to claim 1, wherein at least one of the game-related devices sells balls for playing a game on a game machine.

3. The game facility monitoring system according to claim 1, wherein the at least one of the game-related devices includes means requiring two different and sequential transactions for authenticating each employee, and admitting each employee to and releasing each employee from the game facility.

4. The game facility monitoring system according to claim 1, wherein the at least one of the game machines and game-related devices includes alarm means for issuing respective alarms corresponding to respective anomaly levels whenever the threshold anomaly level is exceeded.

5. The game facility monitoring system according to claim 1, further including a light sensor associated with the camera for detecting when the camera has been obscured to prevent capturing of an image of the person.

6. The game facility monitoring system according to claim 1, wherein the previously recorded identifying information relates to a card issued to a person who plays one of the game machines.

7. The game facility monitoring system according to claim 1, wherein the previously recorded identifying information relates to a card issued to a person who is employed in the game facility.

8. The game facility monitoring system according to claim 1, wherein the means for assigning one of a plurality of anomaly levels assigns anomaly levels based on the disagreement in combination with at least one additional factor.

9. The game facility monitoring system according to claim 8, where the additional factor is selected from the group consisting of detecting opening of a door of any of the game machines and game-related devices, activity of any of the game machines or game-related devices outside business hours of the game facility, and activity of any of the game machines or game-related devices when electrical power to the game facility is disrupted.

10. The game facility monitoring system according to claim 5, further including an alternative camera for capturing an image of the person when the camera has been obscured, wherein the light sensor is coupled to the computer and the computer causes the alternative camera to capture an image of the person when the computer determines from the light sensor that the camera has been obscured.

* * * * *